United States Patent
Wang et al.

(10) Patent No.: US 10,969,465 B2
(45) Date of Patent: Apr. 6, 2021

(54) REFERENCE-FREE NONLINEARITY CORRECTION FOR FMCW-BASED SENSING SYSTEMS

(71) Applicant: Mitsubishi Electric Research Laboratories, Inc., Cambridge, MA (US)

(72) Inventors: Pu Wang, Cambridge, MA (US); David Millar, Concord, MA (US); Chungwei Lin, Boston, MA (US); Kieran Parsons, Cambridge, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 367 days.

(21) Appl. No.: 15/967,700

(22) Filed: May 1, 2018

(65) Prior Publication Data
US 2019/0339359 A1    Nov. 7, 2019

(51) Int. Cl.
*G01S 7/35*    (2006.01)
*G01S 13/32*    (2006.01)
(Continued)

(52) U.S. Cl.
CPC ............ *G01S 7/352* (2013.01); *G01S 7/4913* (2013.01); *G01S 7/534* (2013.01); *G01S 13/32* (2013.01); *G01S 15/32* (2013.01); *G01S 17/32* (2013.01)

(58) Field of Classification Search
CPC .............................. G01S 7/4913; G01S 7/352
(Continued)

(56) References Cited

U.S. PATENT DOCUMENTS 5,252,981 A    10/1993    Grein et al.
6,124,823 A     9/2000    Tokoro
(Continued)

FOREIGN PATENT DOCUMENTS

CN    103837870 A    3/2014
DE    102009029291 A1    3/2011
(Continued)

OTHER PUBLICATIONS

A Method for Nonlinearity Correction of Wideband FMCW Radar (a Non Patent Literature, Author: Ke Jin* ; Tao Lai ; Ting Wang ; Tong-Xin Dang ; Yong-Jun Zhao.
(Continued)

*Primary Examiner* — Eman A Alkafawi
(74) *Attorney, Agent, or Firm* — Gennadiy Vinokur; James McAleenan; Hironori Tsukamoto

(57) ABSTRACT

A frequency modulation continuous wave (FMCW)-based system includes an emitter to transmit at least one linearly modulated wave of radiation to a scene and a receiver to receive a reflection of the transmitted wave from one or multiple objects located at different locations in the scene. The system interferes a copy of the wave outputted by the emitter with the reflection of the transmitted wave received by the receiver to produce a beat signal with spectrum peaks corresponding to reflections from the different locations at the scene. The beat signal is distorted due to the non-linearity of the modulation. The system includes a processor to detect a number of spectrum peaks in the distorted beat signal and, only in response to detecting multiple spectrum peaks, jointly determine coefficients of a basis function approximating the non-linearity of the modulation and distances to the different locations at the scene having the objects causing the reflection resulting in the spectrum peaks in the distorted beat signal.

19 Claims, 26 Drawing Sheets

(51) Int. Cl.
*G01S 15/32* (2006.01)
*G01S 17/32* (2020.01)
*G01S 7/4913* (2020.01)
*G01S 7/534* (2006.01)

(58) Field of Classification Search
USPC ........................................................ 702/159
See application file for complete search history.

(56) References Cited

U.S. PATENT DOCUMENTS

| | | |
|---|---|---|
| 7,068,216 B2 | 6/2006 | Kliewer et al. |
| 7,986,397 B1* | 7/2011 | Tiemann ................ G01S 17/89 356/5.09 |
| 2004/0252047 A1* | 12/2004 | Miyake .................. G01S 13/34 342/107 |
| 2005/0001761 A1 | 1/2005 | Kliewer et al. |
| 2010/0090887 A1* | 4/2010 | Cooper .................. G01S 13/87 342/25 F |
| 2013/0016001 A1 | 1/2013 | Schoeberl et al. |
| 2015/0287235 A1* | 10/2015 | Rose ........................ G01S 7/35 345/424 |
| 2019/0391246 A1* | 12/2019 | Dammert .............. G01S 13/931 |

FOREIGN PATENT DOCUMENTS

| | | |
|---|---|---|
| DE | 102009042102 A1 | 3/2011 |
| DE | 102015219612 A1 | 4/2017 |
| WO | 2004046752 A1 | 6/2004 |

OTHER PUBLICATIONS

The Simple Analysis Method Of Nonlinear Frequency Distortions In FMCW Radar (a Non Patent Literature, Author: Krzysztof S. Kulpa; Andrzej Wojtkiewicz; Marek NaŁęcz; Jacek Misiurewicz).

Range Autofocusing For FMCW Radars Using Timewarping And A Spectral Concenration Measure ( a Non Patent Literature, Author: Andrei Anghel; Gabriel Vasile; Remus Cacoveanu; Cornel Ioana; Silviu Ciochina).

* cited by examiner

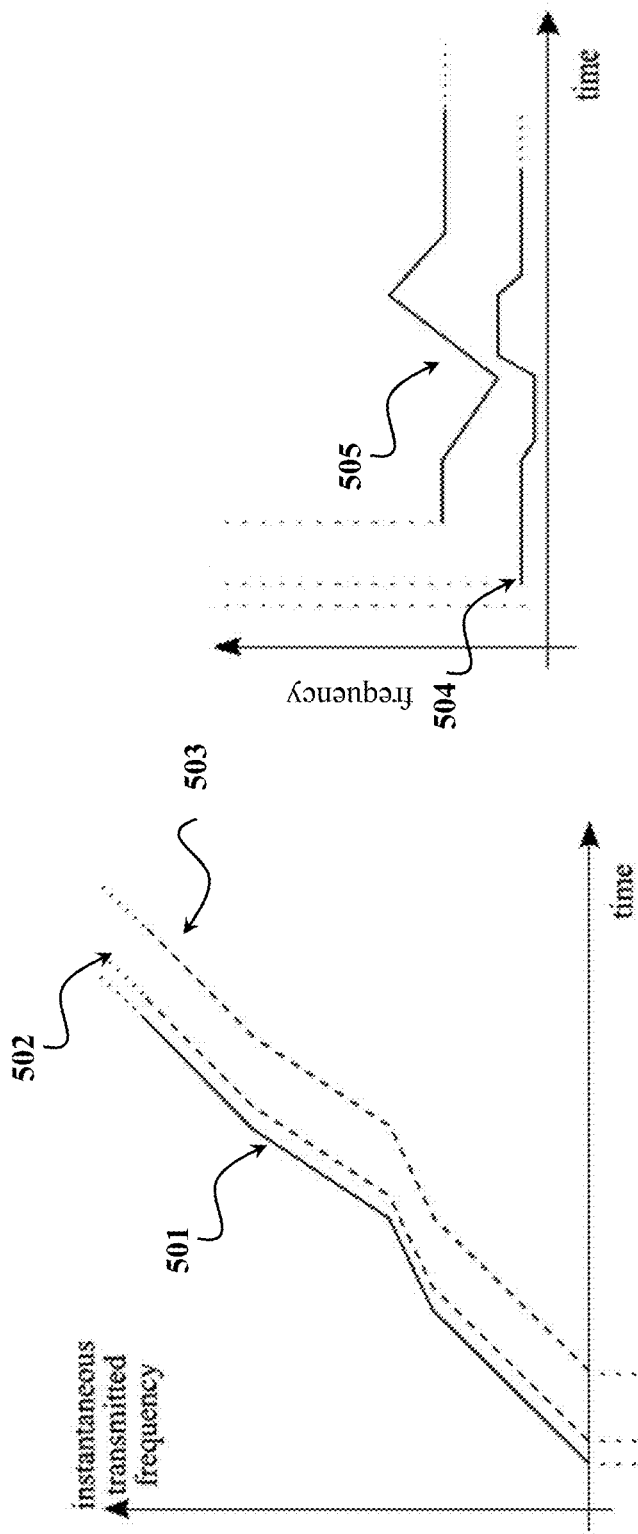

REFERENCE-FREE NONLINEARITY CORRECTION FOR FMCW-BASED SENSING SYSTEMS

TECHNICAL FIELD

This invention relates generally to sensing, frequency modulation, and particularly range and/or velocity estimation using frequency modulated signal.

BACKGROUND

Linearly swept source in sonic, radio and optical frequency ranges have been used to estimate the range (distance) of reflectors with high resolution, low hardware cost, and lightweight signal processing. Frequency modulation continuous wave (FMCW) radar, optical frequency-domain reflectometry (OFDR) and swept source optical coherence tomography (SS-OCT) are typical applications of linear swept sources. Combined with multiple sweeps, the FMCW-based sensing systems can simultaneously estimate the range and (radial) velocity of reflectors. Beside the range and velocity estimates, azimuthal angular directions of reflectors can be estimated if an array of FMCW-based sensors is used.

For example, an FMCW radar transmits linearly frequency-modulated continuous waves, whose frequency pattern follows a saw tooth or triangular pattern with respect to time. Reflected signals from various objects of interest are mixed with the local oscillator signal, which is used to generate the transmitted signal, to produce analog beat signals and output digital beat signals via analog-to-digital converters (ADCs). Since the frequency of the beat signal is proportional to the distance of object, a standard fast Fourier transform (FFT) of the beat signal can be used to identify peaks and estimate the distance. In the case of moving objects, the frequency of beat signal also depends on the radial velocity between the FMCW radar and object. This velocity can be estimated by a second FFT across multiple linear FM scans.

An OFDR interferometer, similarly, provides beat signals that are produced by the optical interference between two light signals: one reference signal originates from a linearly chirped highly-coherent light source and the other is from reflection or backscattering light from an optical path of a fiber under test. The resulting interference signal is collected as a function of optical frequency of a tunable laser source (TLS). An FFT is then used to convert this frequency domain information to spatial information.

Similarly, SS-OCT employs linearly frequency-swept laser to provide high accuracy range solution measurements for imaging applications. With a tunable laser source that scans through a wide range of frequencies with fast sweeping speed and narrow instantaneous linewidth, SS-OCT acquires all range information in a single axial scan from the frequency spectrum of the interference signal between reflected light signal and a stationary reference signal.

One common issue related to all three applications is that the range resolution degrades when the swept source is not completely linearly modulated. The source nonlinearity can be due to nonlinear tuning and phase noise of the laser source, impairments of low-cost voltage controlled oscillator (VCO), and temperature sensitivity of laser source. The non-linearity results in spectrum spreading of beat signals and, hence, deteriorates the spatial resolution and sensitivity. The nonlinearity effect is also range dependent: smaller at short measurement distances and greater at long measurement distances.

State-of-art computational methods use a known reference branch to achieve nonlinearity correction. Specifically, the unknown non-linearity of the modulated source causes the unknown shift in the range estimation, making the entire estimation system underdetermined. To that end, some systems use a dedicated path of a known distance to eliminate at least one unknown from the range estimation and to estimate the non-linearity of the modulation. However, making use of the dedicated path requires additional hardware resources, which is undesirable for some applications.

SUMMARY

Some embodiments disclose a range estimation system and a method suitable for estimating a distance to at least one object in a scene using a signal linearly modulated in a frequency domain. Some embodiments disclose such a range estimation system and a method that can compensate for non-linearity of the modulated signal without relying on a dedicated reference system causing a known delay of the emitted signal.

Some embodiments disclose a range-velocity estimation system and a method suitable for estimating both distance and velocity to at least one object in a scene using a signal linearly modulated in a frequency domain without using a reference branch. For example, some embodiments disclose a range-velocity-azimuth estimation system and a method suitable for estimating simultaneously distance, velocity, and azimuthal angle to at least one object in a scene using a signal linearly modulated in a frequency domain without using a reference branch.

Some embodiments are based on recognition that an interference of a linearly modulated source signal and a reflection of that signal from one or multiple objects located at different locations in the scene produce a beat signal having spectrum peaks at frequencies proportional to the distances from the source of the modulated signal to those different locations at the scene. When there is no non-linearity of the source, i.e., the linear modulation of the signal is indeed linear, the distance to the object can be determined from the peak locations of the beat signal in the frequency domain.

However, the signal modulation is subject to impairments that can cause the undesirable non-linearity in the modulated signal that in turn causes the distortion (including spread and shift of the spectrum peaks) of the beat signal, which reduces the accuracy of the range estimation. Unfortunately, the non-linearity of the modulation can be caused by various factors including aging of the hardware and/or surrounding temperature that varies over time and are difficult to predict in advance.

Some embodiments are based on recognition that the distortion of the beat signal depends not only on the type of non-linearity, but also on the distance to the objects reflecting the modulated signal. In such a manner, the distorted beat signal depends on two types of unknowns: non-linearity of modulation and the distances to the reflecting objects. For example, different non-linearity of the modulation can cause different spreads and shifts of the peaks of the beat signal caused by reflection of the modulated signal from the same object. However, different non-linearity of the modulation can cause the same spreads and shifts of the peaks of the beat signal caused by reflection of the modulated signal from the objects at different distances from the source of non-linearity.

Accordingly, the representation of the distorted beat signal is ill-posed, i.e., underdetermined, because different combinations of values of the non-linearity and the distance to the object can result in the same distorted beat signal.

However, some embodiments are based on the realization that a representation of the distorted beat signal having multiple peaks corresponding to multiple reflections of the linear modulated signal is well-posed, i.e., determined, because only one non-linear function can cause a specific multi-peak distortion. Specifically, this realization is based on understanding that reflection of the modulated signal from a location at the scene carries the information on both the non-linearity of modulation and the reflector-dependent range/delay parameter indicative of the distance to the location. With multiple reflections M, the beat signal is the sum of M responses characterized by M delay parameters and the common source the non-linearity of modulation.

To that end, some embodiments are based on realization that when the non-linearity of modulation is represented by a parameterized function, e.g. a basis function of coefficients that reduce the number of unknowns of the non-linearity of modulation to the number of coefficients, and when the distorted beat signal produces multiple spectrum peaks, it is possible to jointly determine coefficients of a basis function approximating the non-linearity of the modulation and the distances to the different locations at the scene having the objects causing the reflection resulting in the spectrum peaks in the distorted beat signal. That is, when the spreads and shifts of spectrum peaks of the beat signal are analyzed with respect to each other, it is possible to resolve ambiguities of nonlinearity/distances combination from all peak spreads and shifts since, for a known source nonlinearity function, the spread and shift of a peak corresponding to an object can be translated to the spread and shift of another peak corresponding to another object. Therefore, some embodiments can estimate the source nonlinearity which compensates multiple peak distortion at the same time.

For example, one embodiment selects values of the coefficients of the basis function and values of the distances to the locations in the scene such that a beat signal reconstructed with the selected values of the coefficients of the basis function and frequency components with frequencies corresponding to the selected values of the distances to the locations in the scene approximates the distorted beat signal. For example, this simultaneous multiple peak compensation process is accomplished by testing different combinations of nonlinearity functions and multiple distances. For example, from the spectrum of the beat signal, some embodiments can identify two distorted peaks which indicate two objects at different distances and the presence of source nonlinearity. For the simultaneous multiple peak compensation process, some embodiments can pick a candidate of source nonlinearity function and test corresponding translated peak distortions around the distances of both objects. If these two hypothesized peak distortions match with the spectrum of the beat signal, the picked candidate of the source nonlinearity and the tested distances are the estimates of nonlinearity function and the object distances.

Some embodiments further approximate the non-linearity function of the modulation using basis functions. Such an approximation reduces the determination of points of the non-linear function to determination of the coefficients of the basis function. For example, one embodiment approximates the non-linearity function of the modulation in the time domain using a polynomial phase basis function. Similarly, another embodiment approximates the non-linearity function of the modulation in the phase domain using a polynomial basis function. This approximation allows to decompose general smooth non-linearity function by a few number of unknown coefficients within a small approximation error and, hence, recovers the unknown non-linearity function with fewer samples of the beat signal.

Some embodiments are based on realization that the more reflectors are present in the scene, the less ambiguity is present in the simultaneous multiple peak compensation process, the more accurate approximation can be determined by the embodiments. For example, one embodiment selects an order of the polynomial basis function based on the number of spectrum peaks in the beat signal. The more distortions of the multiple peaks of the beat signal the higher the order of the polynomial is, and the more accuracy the approximation is.

One embodiment uses the emitter that emits widespread spatial (azimuth/elevation) beams. This embodiment allows to capture multiple objects in the scene by a single beam. In this embodiment, the two spectrum peaks can correspond to reflection of the widespread beam from two different objects in the scene.

Additionally, or alternatively, one embodiment can rotate the linearly swept source of radiation in a spatial domain to capture a single reflection from a single object at an azimuth or elevation angle at a time. By analyzing multiple beat signals from multiple azimuth or elevation angles, some embodiments apply the simultaneous multiple peak compensation process and identify the source nonlinearity and distances of multiple objects at different azimuth or elevation angles. For example, in one embodiment, the emitter emits low spread beam. In those embodiments, the emitter can include a linearly swept source of radiation and/or a motor or a phased array to mechanically/digitally rotate the linearly swept source in a spatial domain. In these embodiments, the two spectrum peaks can correspond to reflection of two low spread beams from two different objects in the scene, and the embodiments combines multiple reflected signals into a single distorted beat signal with multiple spectrum peaks to perform the signal reconstruction.

Additionally or alternatively, in one embodiment, the object in the scene moves, and the emitter includes a linearly swept source of radiation and a motor to rotate the linearly swept source in a spatial domain to track the object. In this embodiment, the two spectrum peaks can correspond to reflections from the same object in two different positions in the scene. In some implementations, this embodiment also determines the distances to the two different positions of the object detected at two instances of time, and determines the radial velocity of the object from the two positions of the object at the two instances of time.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 5A is a schematic illustrating the time-frequency pattern of the transmitted and reflected FMCW waveforms in the presence of source nonlinearity, according to some embodiments;

FIG. 5B is a schematic illustrating the time-frequency pattern of the beat signal for two reflectors at two distances in the presence of source nonlinearity, according to some embodiments;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1A:
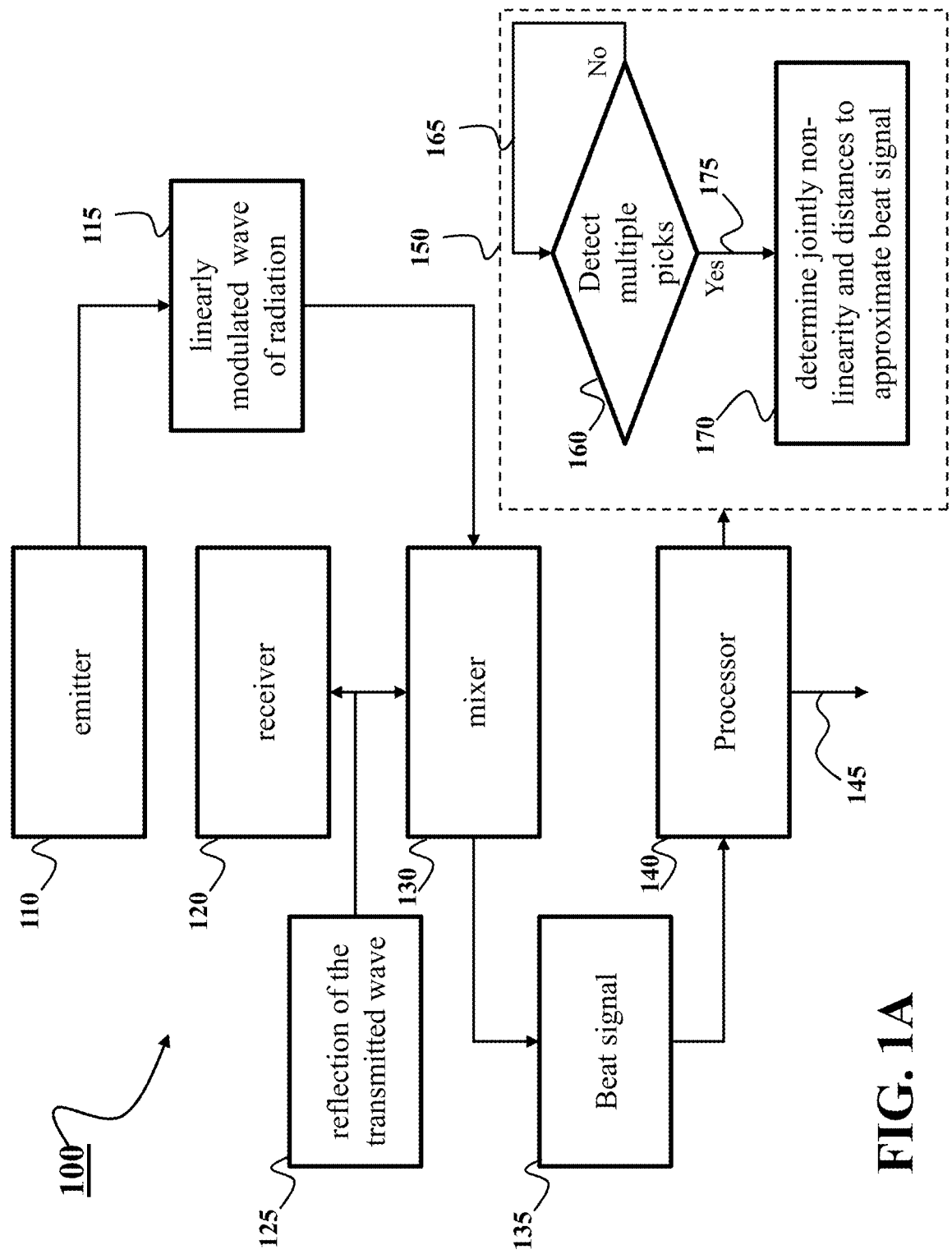
FIG. 1A is a block diagram of a frequency modulation continuous wave (FMCW)-based system suitable for range and/or speed estimation according to some embodiments.

FIG. 1A shows a block diagram of a frequency modulation continuous wave (FMCW)-based system 100 suitable for range and/or speed estimation according to some embodiments. The system 100 includes at least one emitter 110 to transmit at least one wave of radiation 115 to a scene. In various implementations, the emitter includes a linear modulator such that the transmitted wave is linearly modulated in a frequency domain. For example, the emitter can include a source component generating the FMCW waveforms, a power amplifier, and antennas sending the waveform to the media. The modulation of the FMCW waveforms is subject to impairments causing a non-linearity of the modulation of the transmitted wave in the frequency domain. For example, the non-linearity of the modulation can be caused by aging of the hardware and/or surrounding temperature that varies over time.

The system 100 also includes at least one receiver 120 to receive a reflection of the transmitted wave 125 from one or multiple objects/reflectors located at different locations in the scene. The system 100 also includes a mixer 130 operatively connected to the emitter 110 and the receiver 120 to interfere a copy of the wave 115 outputted by the emitter with the reflection of the transmitted wave 125 received by the receiver to produce a beat signal 135. For example, the receiver can include receiving antennas, a low noise amplifier (LNA), and the mixer that multiplies the received waveform with the source FMCW waveform. Due to the beating, the beat signal 135 includes spectrum peaks corresponding to reflections from the different locations at the scene. However, the beat signal 135 is distorted due to the non-linearity of the modulation. This distortion can include or cause one or combination of spread and shift of the spectrum peaks of the beat signal, which reduces the accuracy of the range estimation.

Some embodiments are based on recognition that the distortion of the beat signal depends not only on the type of non-linearity, but also on the distance to the objects reflecting the modulated signal. In such a manner, the distorted beat signal depends on two types of unknowns: non-linearity of modulation and the distances to the reflecting objects. For example, different non-linearity of the modulation can cause different spreads and shifts of the peaks of the beat signal caused by reflection of the modulated signal from the same object. However, different non-linearity of the modulation can cause the same spreads and shifts of the peaks of the beat signal caused by reflection of the modulated signal from the objects at different distances from the source of non-linearity. Accordingly, the representation of the distorted beat signal is ill-posed, i.e., underdetermined, because different combinations of values of the non-linearity and the distance to the object can result in the same distorted beat signal.

However, some embodiments are based on the realization that a representation of the distorted beat signal having multiple peaks corresponding to multiple reflections of the linear modulated signal transforms the ill-posed problem into a well-posed, i.e., determined, problem, because only one non-linear function can cause a specific multi-peak distortion. Specifically, this realization is based on understanding that reflection of the modulated signal from a location at the scene carries the information on both the non-linearity of modulation and the reflector-dependent range/delay parameter indicative of the distance to the location. With multiple reflections M, the beat signal is the sum of M responses characterized by M delay parameters and the common source the non-linearity of modulation.

To that end, the system 100 includes a processor 140 configured to resolve 150 the distortion ambiguity in determining the distances to multiple objects in the scene. A processor can store, digitally sample and process the data to estimate the range and speed information of multiple reflectors in the scene. Finally, an output interface can be used to render the position and speed of multiple reflectors.

Specifically, the processor 140 is configured to detect 160 a number of spectrum peaks in the distorted beat signal. For example, the processor compares the number of spectrum peaks in the distorted beat signal with a threshold defining an accuracy of the distance estimation to detect multiple spectrum peaks. If the multiple peaks are not detected 160, the range estimation problem is ill-posed. However, when the multiple peaks are detected 165, the range estimation problem becomes well-posed. That is, when the spreads and shifts of spectrum peaks of the beat signal are analyzed with respect to each other, it is possible to resolve ambiguities of nonlinearity/distances combination from all peak spreads and shifts since, for a known source nonlinearity function, the spread and shift of a peak corresponding to an object can be translated to the spread and shift of another peak corresponding to another object. Therefore, some embodiments can estimate the source nonlinearity which compensates multiple peak distortion at the same time.

Accordingly, the processor 140, only in response to detecting multiple spectrum peaks, jointly determines 170 the non-linearity of the modulation and the distances 145 to the different locations at the scene having the objects causing the reflection resulting in the spectrum peaks in the distorted beat signal.

In some embodiments, the processor jointly determines coefficients of a basis function approximating the non-linearity of the modulation and distances to the different locations at the scene having the objects causing the reflection resulting in the spectrum peaks in the distorted beat signal. These embodiments are based on realization that when representation of the non-linearity of modulation with a parameterized function, e.g., a basis function of coefficients, reduces the number of unknowns of the non-linearity of modulation to the number of coefficients to simplifies the search and to reduce the computational burden of the processor 140.

Figure 1B:
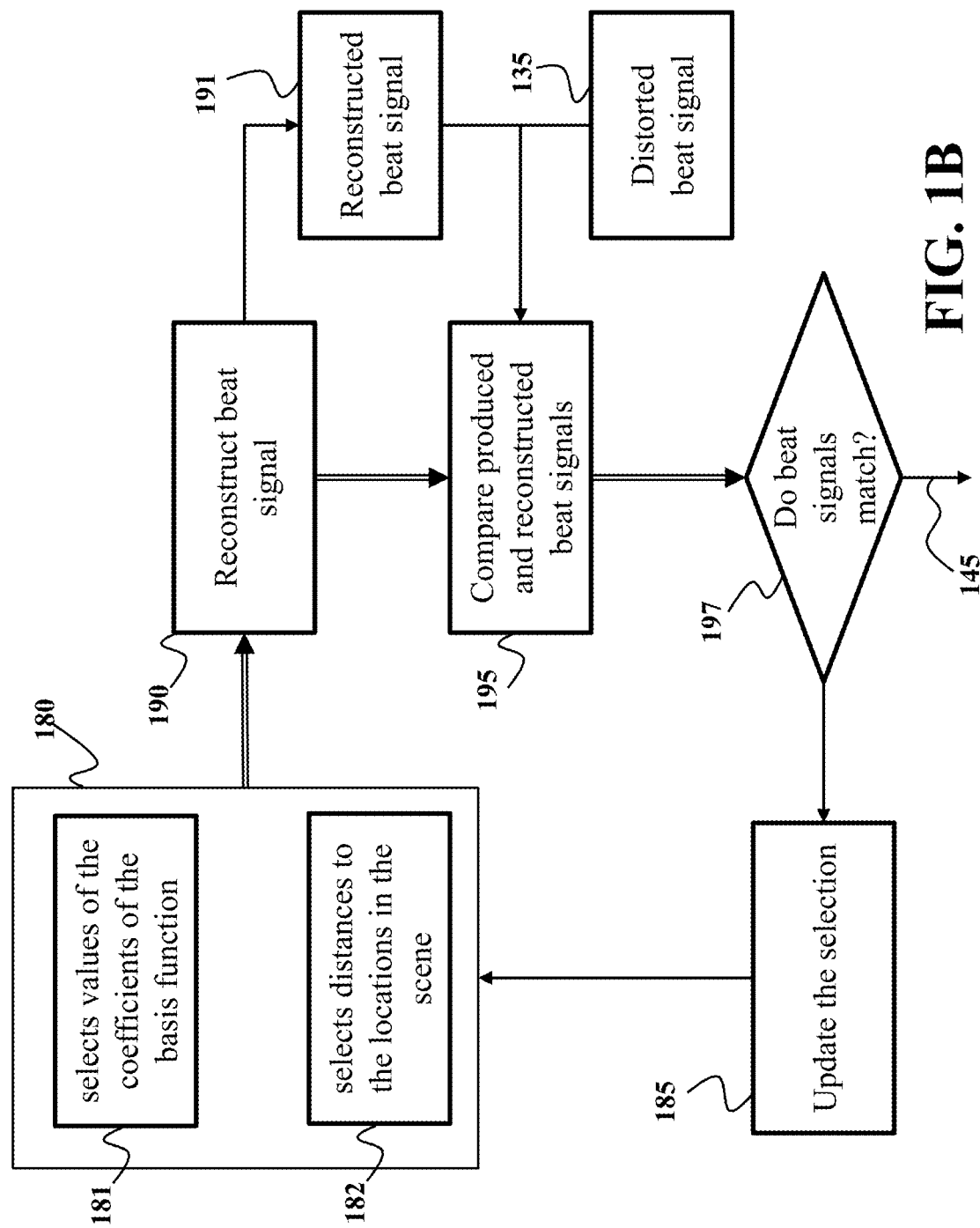
FIG. 1B is a schematic of joint determination of the coefficients of a basis function approximating the nonlinearity of the modulation and distances to the different locations at the scene according to one embodiment.

FIG. 1B shows a schematic of joint determination of the coefficients of a basis function approximating the non-linearity of the modulation and distances to the different locations at the scene according to one embodiment. For example, the embodiment selects 180 values of the coefficients of the basis function 181 and values of the distances to the locations in the scene 182 such that a beat signal reconstructed with the selected values of the coefficients of the basis function and frequency components with frequencies corresponding to the selected values of the distances to the locations in the scene approximates the distorted beat signal.

To that end, some embodiments reconstruct 190 the beat signal 191 using the selected values 181 and 182 and compare 195 the reconstructed beat signal 191 with the distorted beat signal 135 produced by the mixer 130. The beat signal 191 can be reconstructed using various signals processing techniques. For example, the beat signal can be reconstructed using the estimated distances from 182 and the coefficient values from 181. When the results of comparison 195 shows that the reconstructed 191 and distorted 135 beat signals are matching to each other, e.g., their difference is less than a threshold, the selected values of the distances to the locations in the scene 182 are outputted as the final distances 145. Otherwise, the selection 180 is updated 185 with new values 181 and/or 182 to reconstruct the new beat signal.

For example, this simultaneous multiple peak compensation process is accomplished by testing different combinations of nonlinearity functions and multiple distances. For example, from the spectrum of the beat signal, some embodiments can identify two distorted peaks, which indicate two objects at different distances and the presence of source nonlinearity. For the simultaneous multiple peak compensation process, some embodiments can pick a candidate of source nonlinearity function and test corresponding translated peak distortions around the distances of both objects. If these two hypothesized peak distortions match with the spectrum of the beat signal, the picked candidate of the source nonlinearity and the tested distances are the estimates of nonlinearity function and the object distances. In one implementation, the processor tests a set of combinations of different values of the coefficients of the basis function and different values of the distances to the locations in the scene to produce a set of reconstructed beat signals, and selects the coefficients and the distances resulting in the reconstructed beat signal closest to the distorted beat signal.

Some embodiments further approximate the non-linearity function of the modulation using basis functions. Such an approximation reduces the determination of points of the non-linear function to determination of the coefficients of the basis function. For example, one embodiment approximates the non-linearity function of the modulation in the time domain using a polynomial phase basis function. Similarly, another embodiment approximates the non-linearity function of the modulation in the phase domain using a polynomial basis function.

This approximation allows to decompose general smooth non-linearity function by a few number of unknown coefficients within a small approximation error and, hence, recovers the unknown non-linearity function with fewer samples of the beat signal. In addition, this approximation allows to analytically determine the coefficients of the basis function and the distance to the objects in the scene.

Figure 1C:
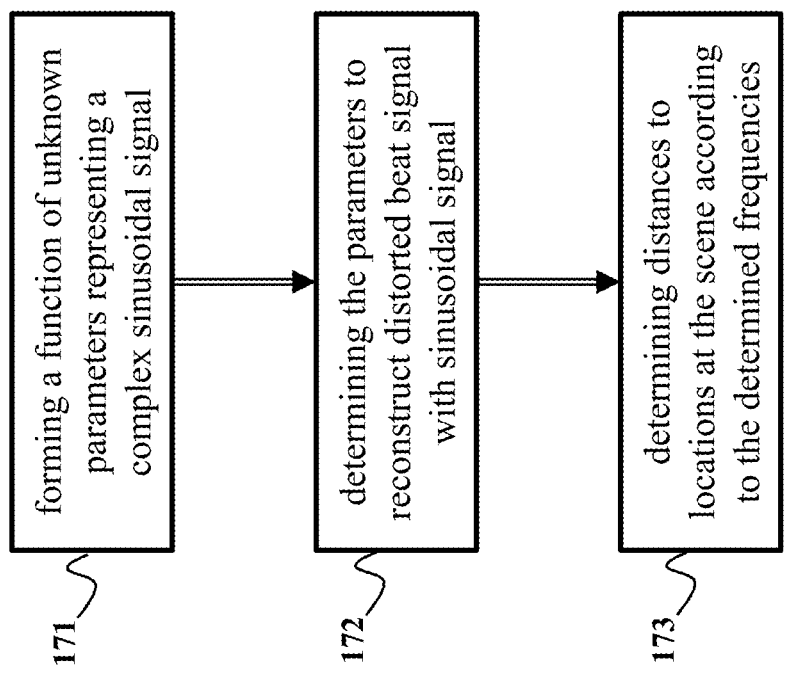
FIG. 1C is a block diagram of a method for joint determination of the coefficients of a basis function approximating the non-linearity of the modulation and distances to the different locations at the scene according to another embodiment.

FIG. 1C shows a block diagram of a method for joint determination of the coefficients of a basis function approximating the non-linearity of the modulation and distances to the different locations at the scene according to another embodiment. In this embodiment, the processor forms 171 a function of unknown parameters representing a complex sinusoidal signal. The unknown parameters of the sinusoidal signal include the coefficients of the basis function and frequencies of the spectrum peaks. In some implementations, a number of coefficients is defined by an order of the basis function, e.g., the number is three for the third order basis function, while a number of the frequencies is defined by the number of the spectrum peaks in the distorted beat signal counted by the processor.

Next, the processor determines 172 the unknown parameters including the coefficients and the frequencies to reconstruct the distorted beat signal with the complex sinusoidal signal. Different embodiments can use different techniques to reconstruct the distorted beat signal in order to determine the unknown parameters. For example, one embodiment determines the unknown parameters using a phase unwrapping. For example, this embodiment unwraps phases of the received distorted beat signal, and fits the unwrapped phases on a model of the complex sinusoidal signal using a least squares method. Additionally or alternatively, another embodiment determines the unknown parameters using a time-frequency analysis. For example, this embodiment determines frequencies of phases of the received distorted beat signal, and fits the determined frequencies phases on a model of the complex sinusoidal signal using a least squares method.

After the unknown parameters of the complex sinusoidal signal are determined 172, some embodiments determine 173 the distances to the different locations at the scene according to the determined frequencies.

The FMCW-based sensing system can use different types of emitters to transmit the linear modulated signal. For example, one embodiment uses the emitter that emits widespread spatial (azimuth/elevation) beams. This embodiment allows to capture multiple objects in the scene by a single beam. In this embodiment, the two spectrum peaks can correspond to reflection of the widespread beam from two different objects in the scene.

Additionally, or alternatively, another embodiment rotates the linearly swept source of radiation in a spatial domain to capture a single reflection from a single object at an azimuth or elevation angle at a time. By analyzing multiple beat signals from multiple azimuth or elevation angles, some embodiments apply the simultaneous multiple peak compensation process and identify the source nonlinearity and distances of multiple objects at different azimuth or elevation angles. For example, in one embodiment, the emitter emits low spread beam. In those embodiments, the emitter can include a linearly swept source of radiation and/or a motor or a phased array to mechanically/digitally rotate the linearly swept source in a spatial domain. In these embodiments, the two spectrum peaks can correspond to reflection of two low spread beams from two different objects in the scene, and the embodiments combines multiple reflected signals into a single distorted beat signal with multiple spectrum peaks to perform the signal reconstruction.

Additionally or alternatively, in another embodiment, the object in the scene moves, and the emitter includes a linearly swept source of radiation and a motor to rotate the linearly swept source in a spatial domain to track the object. In this embodiment, the two spectrum peaks can correspond to reflections from the same object in two different positions in the scene. In some implementations, this embodiment also determines the distances to the two different positions of the object detected at two instances of time, and determines the radial velocity of the object from the two positions of the object at the two instances of time.

Figure 2A:
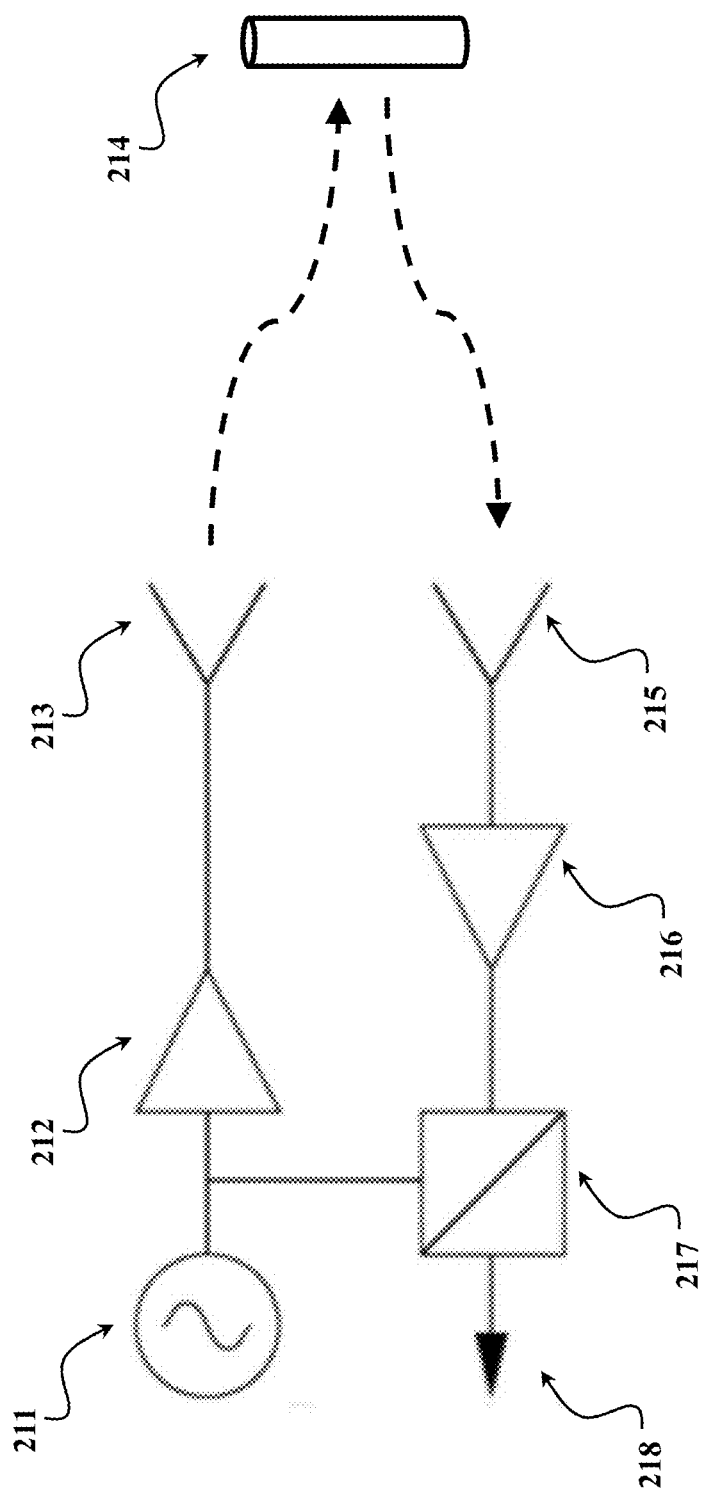
FIG. 2A is a schematic of FMCW-based system implemented as a FMCW-based electromagnetic sensing system according to some embodiments.

FIG. 2A shows a schematic of FMCW-based system 100 implemented as a FMCW-based electromagnetic sensing system according to some embodiments. The FMCW-based electromagnetic sensing system emits a waveform to a reflector, receives the reflected waveform, mixes the reflected waveform with the transmitted waveform, and generates the beat signal, according to different embodiments. The FMCW-based electromagnetic sensing system includes an FMCW source 211 that sweeps the frequency over a short period of time, e.g., [77, 81] GHz for automotive radar. The source FMCW waveform can be generated by a baseband FMCW waveform (e.g., [−2, 2] GHz) and an up-converter to modulate the baseband FMCW waveform to the carrier frequency, e.g., 79 GHz. The source FMCW waveform is then amplified by the power amplifier 212 before feeding into transmitting antennas 213. The transmitting antennas send towards the scene to detect potential reflectors 214. The reflected waveform from at least one reflector 214 is captured by the receiving antennas 215. The received waveform is then passed through the LNA 216 to increase the signal-to-noise ratio (SNR). Then the received waveform is mixed with the source FMCW waveform by the mixer 217, which generates the beat signal 218.

Figure 2B:
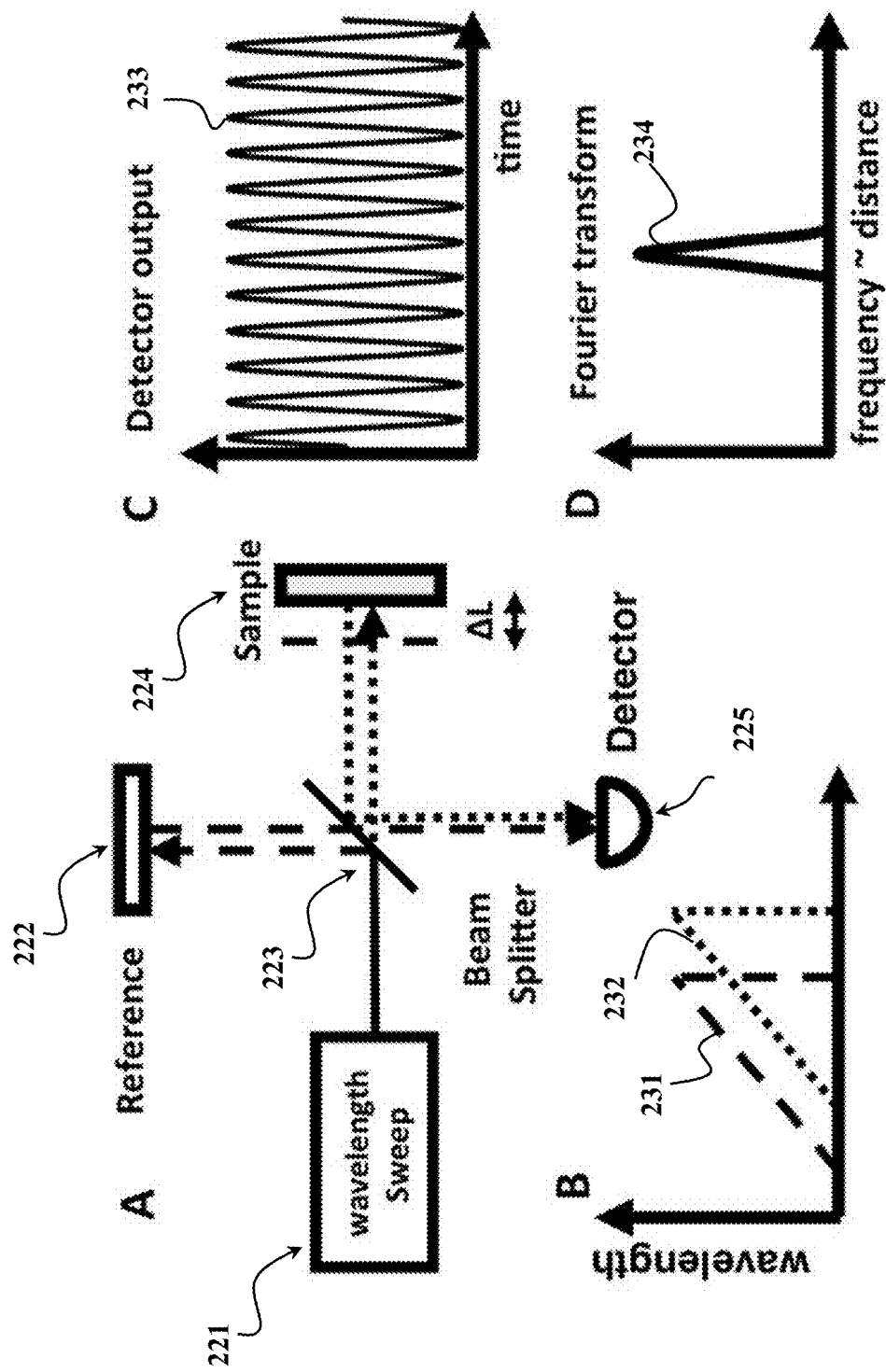
FIG. 2B is a schematic of FMCW-based system implemented as a FMCW-based swept-source optical coherent sensing (SS-OCT) system according to some embodiments.

FIG. 2B shows a schematic of FMCW-based system 100 implemented as a FMCW-based swept-source optical coherent sensing (SS-OCT) system according to some embodiments. In some implementations, the swept-source OCT system includes a reference arm, a sample arm, and a photodetector. The light is generated from a frequency-swept laser source 221 with a time-frequency pattern, such as the pattern 231, is split by a beam splitter 203 to both a reference mirror 222 and a sample of interest 224. Backscattered and reflected light from the sample is interfered with reflection from the reference mirror with a time-frequency pattern, such as the pattern 232. The beat signal, e.g., the beat signal, such as the beat signal 233, is then detected by the detector 225. At a fixed sweep rate, different beat frequencies correspond to different delays, or reflections from different depths in the sample. Thus, by linearizing and Fourier transforming the interference signal 234, some embodiments obtain an axial profile of reflection magnitude vs. depth. In conjunction with x-y scanning, multiple axial scans can be used to create 2D and 3D comprehensive, volumetric data sets that can be used to construct arbitrary cross-sectional images, projections along arbitrary axes, or renderings similar to MRI or CT.

Figure 3:
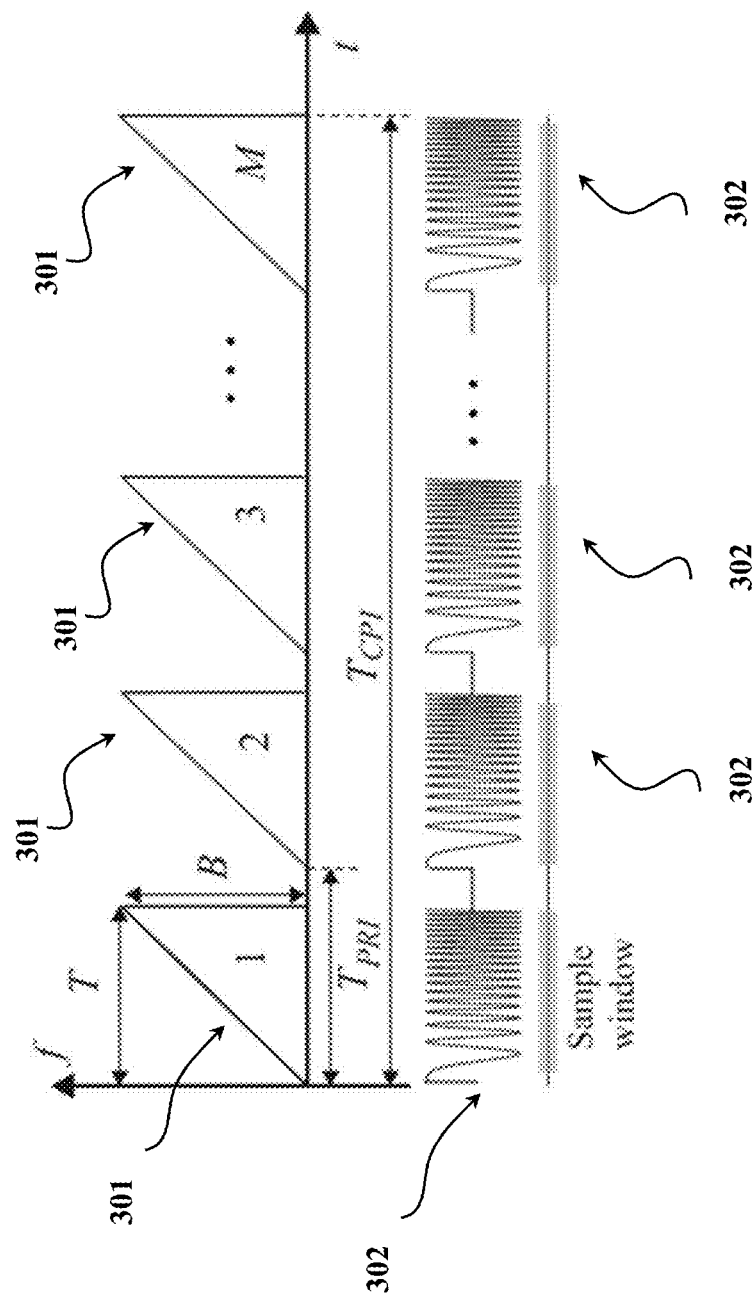
FIG. 3 is a schematic illustrating a multi-scan waveform used by the FMCW system for range and speed estimation according to some embodiments.

FIG. 3 is a schematic illustrating a multi-scan waveform used by the FMCW ranging system according to embodiments. For each scan, the transmitted waveform possesses a linear frequency pattern 301 over a time period T and a time-domain waveform similar to 302, followed by a short period of silence. After a pulse repetition interval (PRI) $T_{PRI}$, linearly frequency swept waveform is transmitted repeatedly M times for a total duration of $T_{CPI}$. For each scan, the FMCW-based sensing system is able to detect the distance of multiple reflectors. If the target moves from one scan to another, the speed can be estimated.

Figure 4A:
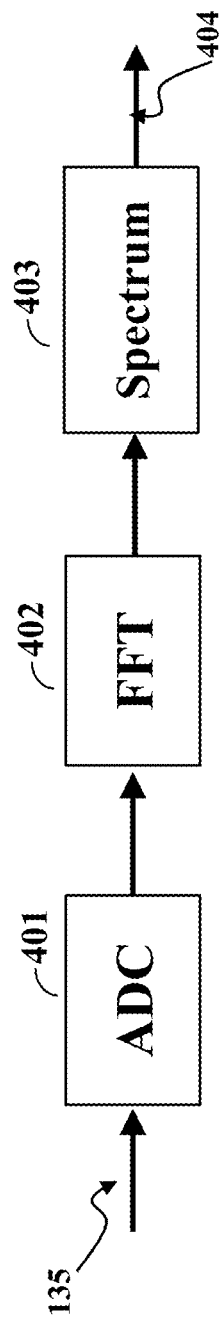
FIG. 4A is a block diagram illustrating receivers to sample the beta signal and perform the range/speed estimation according to some embodiments.

FIG. 4A is a block diagram illustrating a receiver to sample the beat signal and perform the distance estimation according to one embodiment. In this embodiment, the analog-to-digital converter (ADC) 401 samples the analog beat signal 135 into the digital signal. The digital beat signal is then transformed to the Fourier domain by the Fourier transformer (FFT) 402. The spectrum of the beat signal over frequency 403 describes the reflected energy distribution over the range domain. To determine the range information of a number of strong reflectors, their corresponding peak frequencies can be identified and then translated to their distance information 404.

Figure 4C:
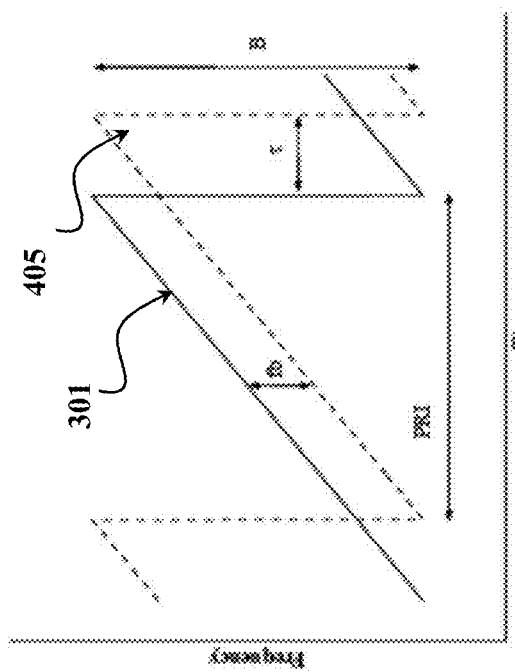
FIG. 4C is a schematic illustrating the time-frequency pattern of the transmitted and reflected FMCW waveforms, according to some embodiments.
Figure 4B:
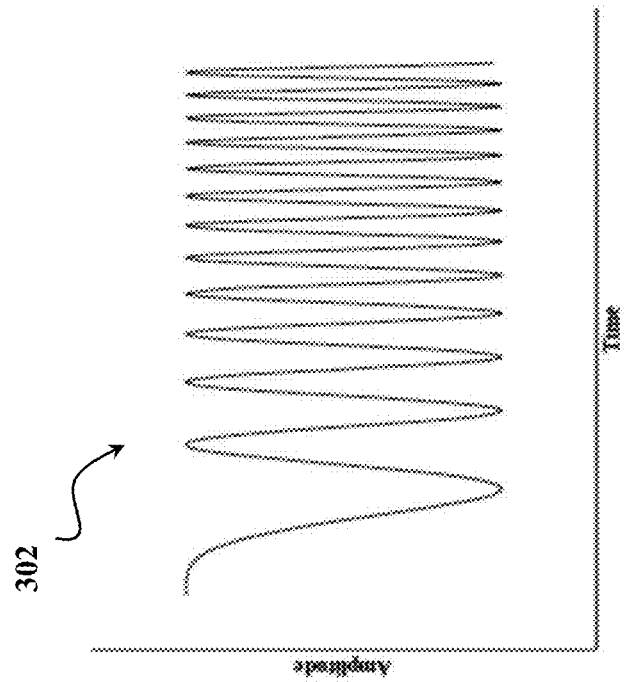
FIG. 4B is a schematic illustrating a time-domain FMCW waveform according to some embodiments.
Figure 4E:
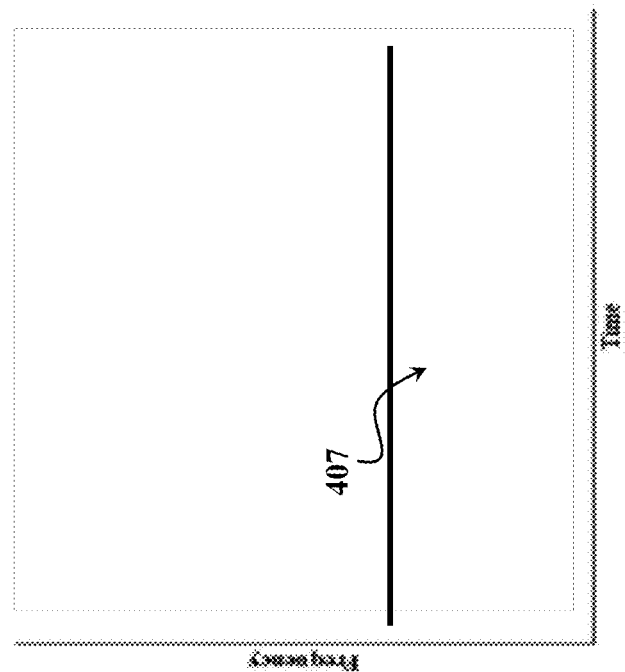
FIG. 4E is a schematic illustrating the time-frequency pattern of the beat signal by mixing the reflected waveform with the transmitted waveform, according to some embodiments.
Figure 4D:
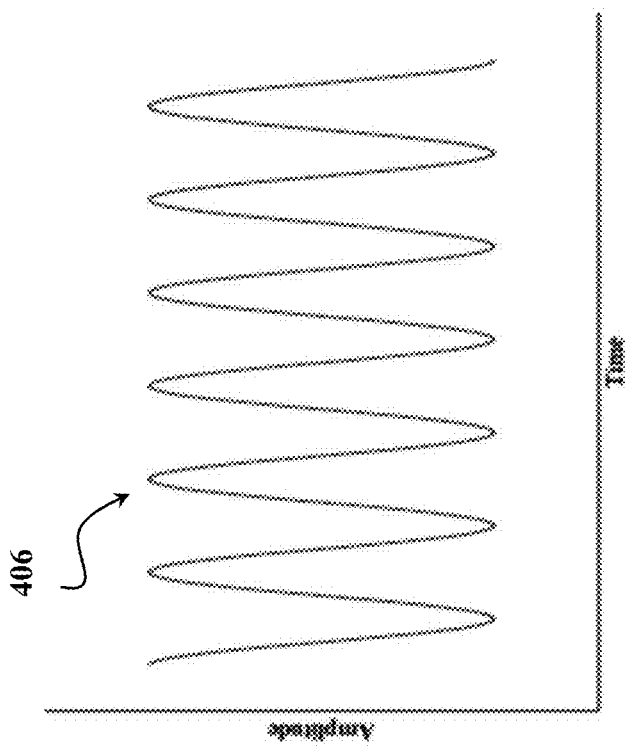
FIG. 4D is a schematic illustrating a time-domain waveform of the beat signal by mixing the reflected waveform with the transmitted waveform, according to some embodiments.

FIG. 4B is a schematic illustrating a time-domain FMCW waveform 302 used by some embodiments. FIG. 4C is a schematic illustrating the time-frequency pattern 301 of the FMCW waveform transmitted by some embodiments. FIG. 4E is a schematic illustrating the time-frequency pattern of the beat signal determined by some embodiments. Due to the round-trip delay from the transmitter to a single reflector, the time-frequency pattern 405 of the reflected FMCW waveform is shifted to the right as shown in FIG. 4C. The mixer generates the beat signal 406 as shown in FIG. 4D. For a single reflector, the beat signal dominates at one frequency which corresponds to its own distance to the transmitter. In other words, the time-frequency pattern 407 of the beat signal in FIG. 4E is parallel to the time axis.

FIG. 5A is a schematic illustrating the time-frequency pattern of the transmitted and reflected FMCW waveforms in the presence of source nonlinearity, according to some embodiments. The FMCW-based sensing system requires an ideal linear frequency pattern to determine the distance of reflectors from the beat signal. When there is a source nonlinearity caused by hardware impairments, low-cost components, and open-loop VCOs, the time-frequency pattern 501 is no longer completely linear. For two reflectors at different distances to the transmitter, the time-frequency pattern of the reflected signal is then shifted according to the corresponding round-trip delay. For example, the time-frequency pattern of the closer reflector is given by the dash line 502, while the further reflector has a time-frequency pattern given by the dash line 503. When both reflected signals from two different reflectors are mixed with the source signal, the beat signal includes two components, which show different distortions due to the source nonlinearity. Particularly, the closer reflector gives the beat signal with the time-frequency pattern 504, while the further reflectors gives the beat signal with the time-frequency pattern 505. Even given the same source nonlinearity, its effect on the spectrum of the beat signal is range-dependent. When the source nonlinearity function and the range information of reflectors are both unknown, one may not be able to mitigate the distortion in the beat signal.

Figure 6A:
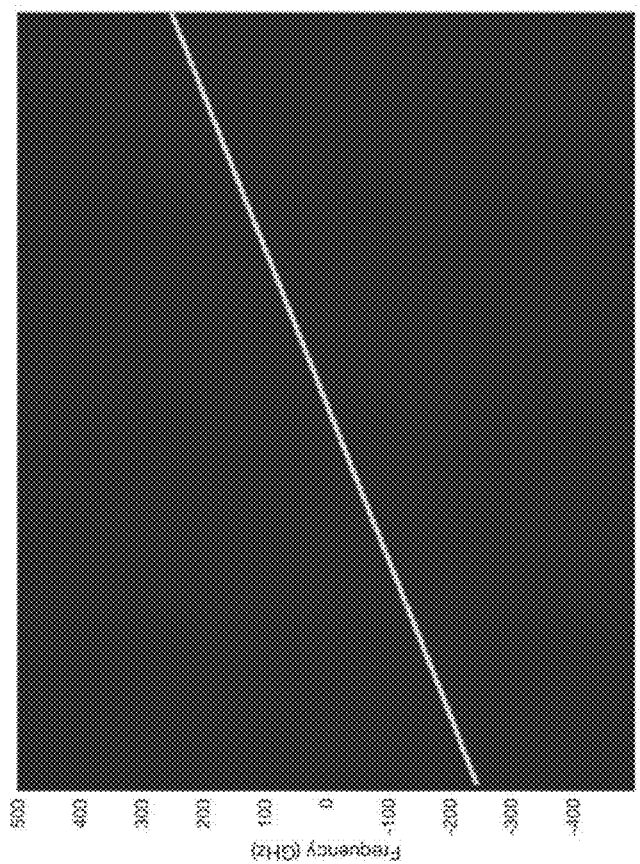
FIG. 6A is a schematic illustrating the spectrogram of a perfect FMCW source waveform, according to some embodiments.
Figure 6B:
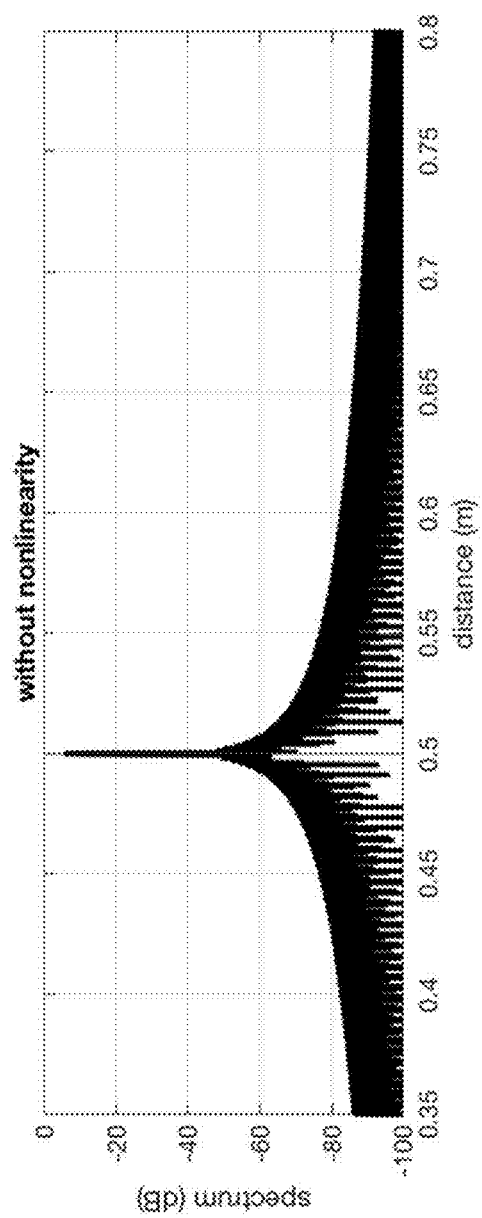
FIG. 6B is a schematic illustrating the FFT-based spectrum of the beat signal without the source nonlinearity, according to some embodiments.

FIG. 6A is a schematic illustrating the spectrogram of an ideal FMCW source waveform. FIG. 6B is a schematic illustrating the FFT-based spectrum of the beat signal for a single reflector without the source nonlinearity. Without the source nonlinearity, the spectrum of the beat signal shows a distinct peak with a magnitude 60-dB stronger than the spectrum floor.

Figure 6C:
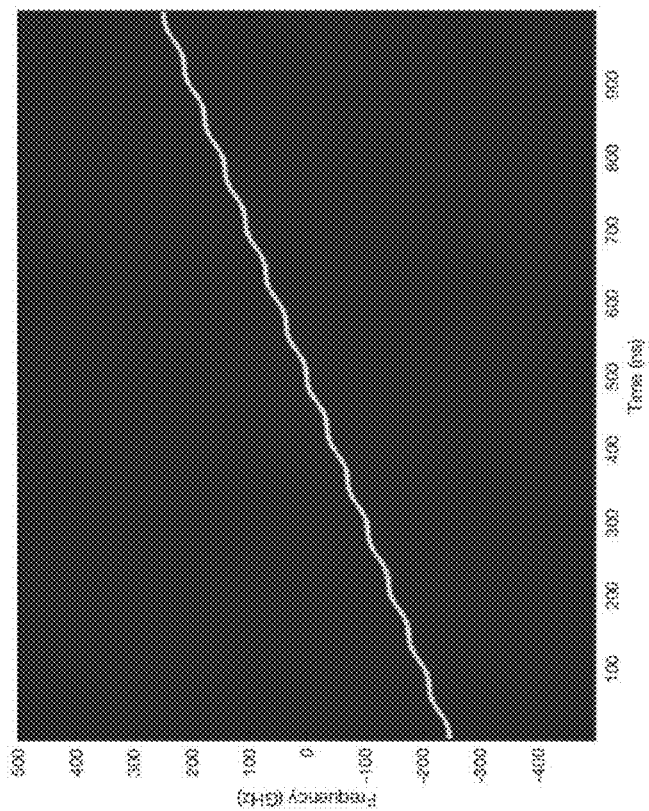
FIG. 6C is a schematic illustrating the spectrogram of an FMCW source waveform in the presence of a sinusoidal nonlinearity, according to some embodiments.
Figure 6D:
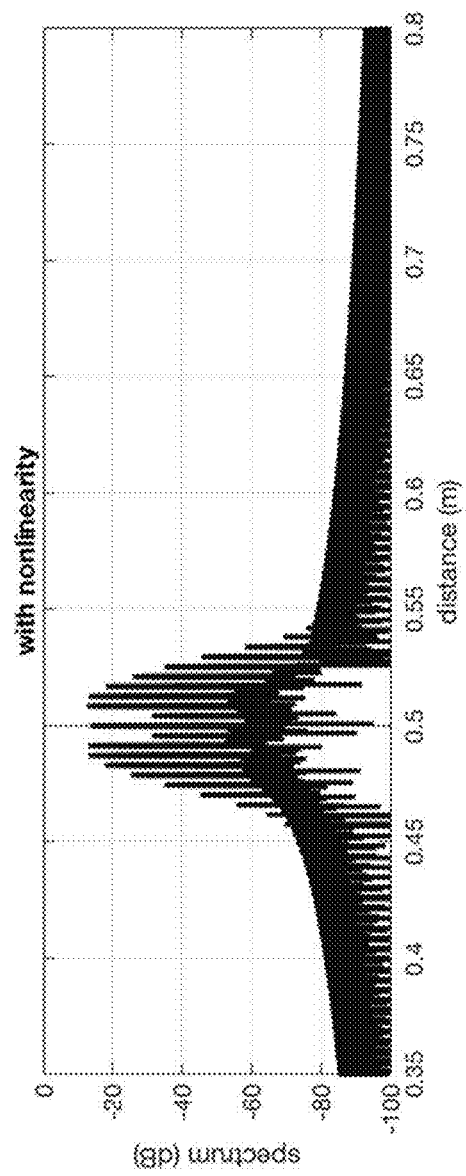
FIG. 6D is a schematic illustrating the FFT-based spectrum of the beat signal in the presence of a sinusoidal nonlinearity, according to some embodiments.

FIG. 6C is a schematic illustrating the spectrogram of a perturbed FMCW source waveform in the presence of a sinusoidal nonlinearity according to some embodiments. FIG. 6D is a schematic illustrating the FFT-based spectrum of the beat signal for a single reflector in the presence of a sinusoidal nonlinearity, according to some embodiments. It is seen that, with this particular type of sinusoidal nonlinearity, the spectrum of the beat signal contaminated by periodic peaks, which causes challenges to estimate the distance of the single reflector.

Figure 7B:
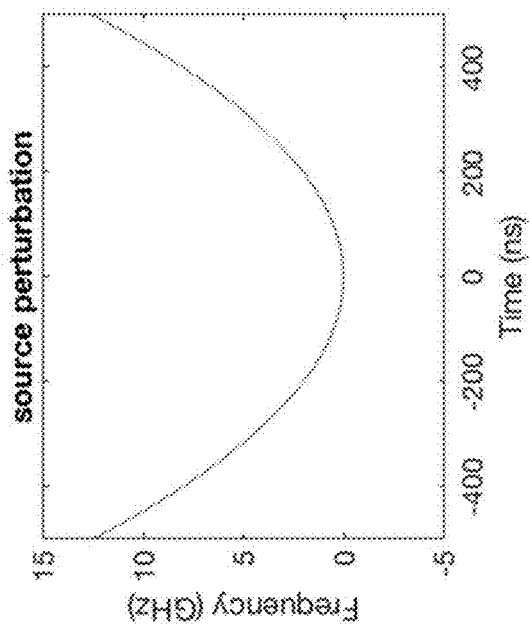
FIG. 7B is a schematic showing the difference between the ideal and perturbed FMCW source waveforms in the time-frequency domain when there is a polynomial nonlinearity, according to some embodiments.
Figure 7A:
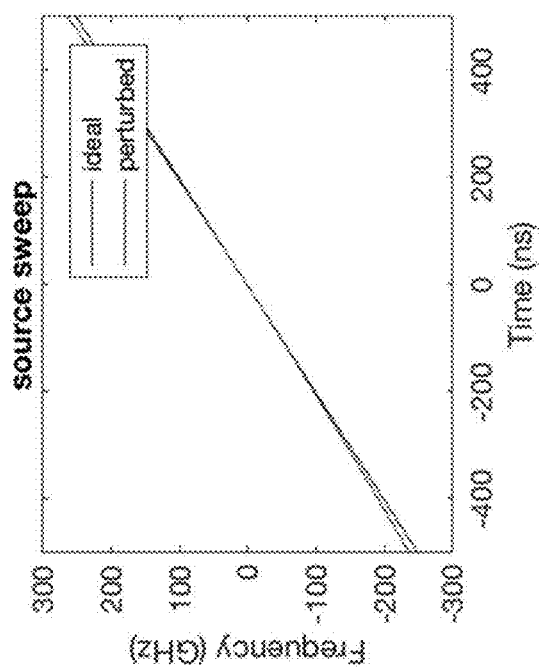
FIG. 7A is a schematic comparing the time-frequency patterns between the ideal and perturbed FMCW source when there is a polynomial nonlinearity, according to some embodiments.

FIG. 7A is a schematic comparing the time-frequency patterns between the ideal and perturbed FMCW source when there is a polynomial nonlinearity. FIG. 7B is a schematic showing the difference between the ideal and perturbed FMCW source waveforms in the time-frequency domain when there is a polynomial nonlinearity, according to some embodiments. It is seen that this polynomial nonlinearity results in larger frequency differences at the beginning and end of the time interval.

Figure 7C:
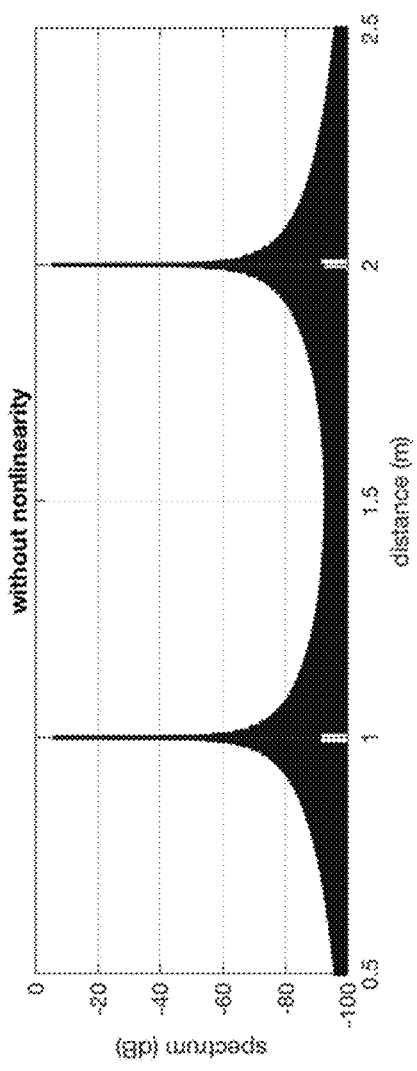
FIG. 7C is a schematic illustrating the FFT-based spectrum of the beat signal corresponding to two reflectors with an ideal FMCW source waveform, according to some embodiments.
Figure 7D:
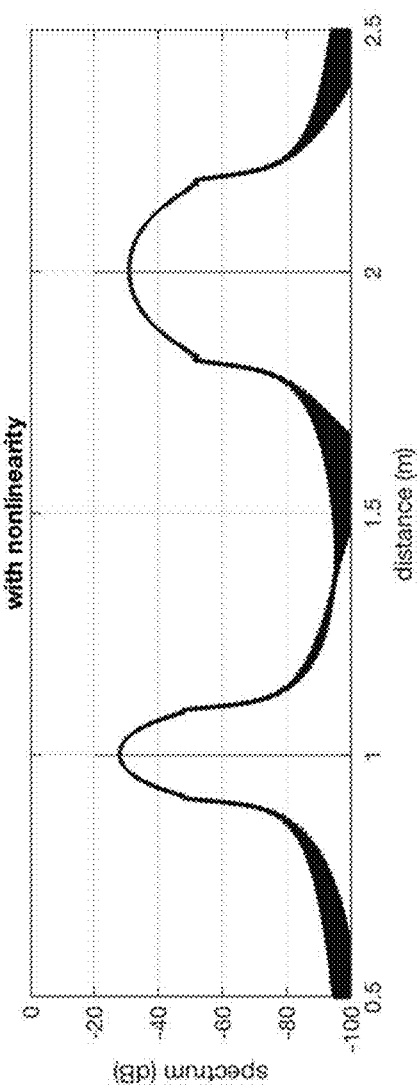
FIG. 7D is a schematic illustrating the FFT-based spectrum of the beat signal corresponding to two reflectors when there is a polynomial nonlinearity, according to some embodiments.

FIG. 7C is a schematic illustrating the FFT-based spectrum of the beat signal corresponding to two reflectors at 1 m and 2 m, respectively, away from the source, when the transmitted waveform has no source nonlinearity. FIG. 7D is a schematic illustrating the FFT-based spectrum of the beat signal corresponding to two reflectors when there is a polynomial nonlinearity. It is seen that, the spectra of the two reflected waveforms have different distortions for the same nonlinearity due to the range-dependent effect.

In some embodiments, the FFT-based is designed to work with on a dedicated reference system causing a known delay of the emitted signal. Those embodiments are based on understanding that even with the reference beat signal from a known distance, the estimated nonlinearity function is still subject to estimation errors compensate using principles described in this disclosure. Additionally or alternatively, some embodiments disclose such a range estimation system and a method that can compensate for non-linearity of the modulated signal without relying on a dedicated reference system causing a known delay of the emitted signal.

Figure 8:
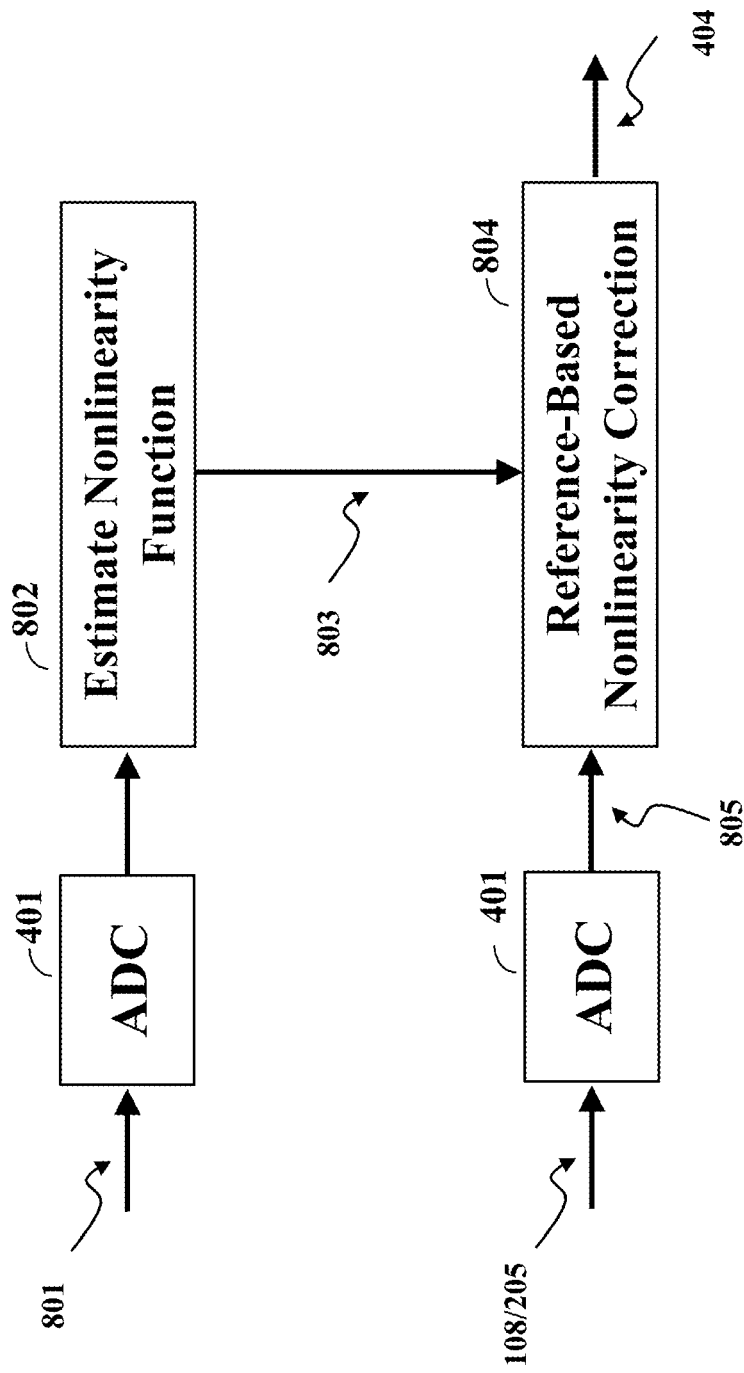
FIG. 8 is a block diagram illustrating a reference-based nonlinearity correction approach, according to some embodiments.

FIG. 8 is a block diagram illustrating a reference-based nonlinearity correction approach, according to some embodiments. The reference-based nonlinearity correction approach includes two types of beat signals: One 108/205 is from the reflector with unknown range information and the other 801 from the reflector with a known distance, or a delay line, or a reference. The reference beat signal is digitally sampled by the ADC 401. Since we know the distance of reflectors in the reference beat signal, processing the digital reference beat signal can lead to an estimation of the source nonlinearity function 802. The estimated source nonlinearity function 803 is then used, along with the beat signal corresponding to unknown reflectors 805, by a number of nonlinearity correction methods 804 to recover the distance information 404 of the unknown reflectors.

Figure 9:
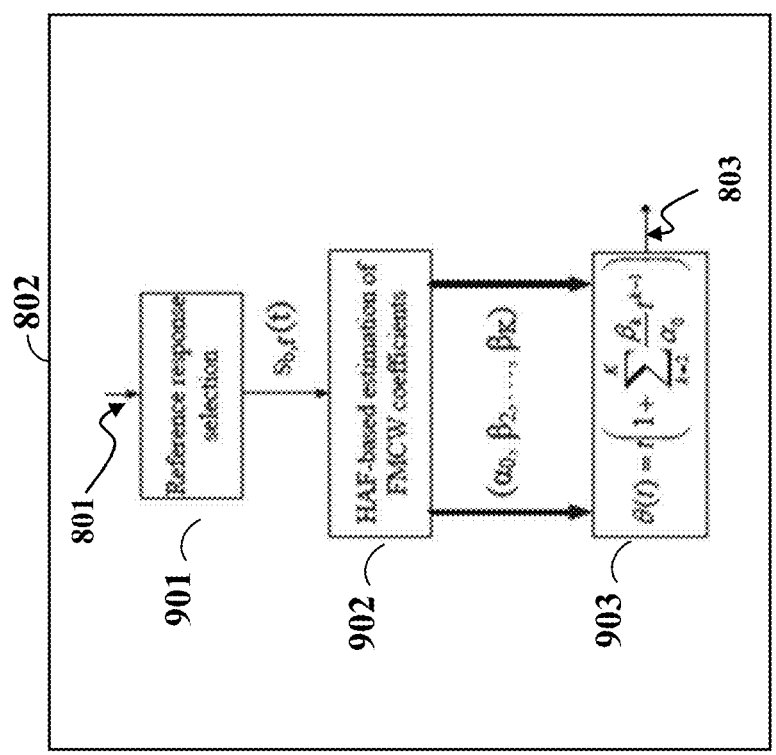
FIG. 9 is a block diagram illustrating a parametric step to estimate the source nonlinearity function used by the reference-based nonlinearity correction approach, according to some embodiments.

FIG. 9 is a block diagram illustrating a parametric step to estimate the source nonlinearity function used by the reference-based nonlinearity correction approach, according to some embodiments. Step 802 in FIG. 9 illustrates a parametric approach to estimate the source nonlinearity function using the reference beat signal 801 reflected from a known distance. It assumes the source nonlinearity function can be represented by a polynomial function with unknown coefficients. This particular approach includes three steps: Step 901 uses the whole reference beat signal 801 or selects a portion of it. Then Step 902 uses a high-order ambiguity function (HAF) to process the selected beat signal and outputs the parametric coefficients of the polynomial function. Finally Step 903 reconstructs the source nonlinearity function 803 using the estimated parametric coefficients.

Figure 10:
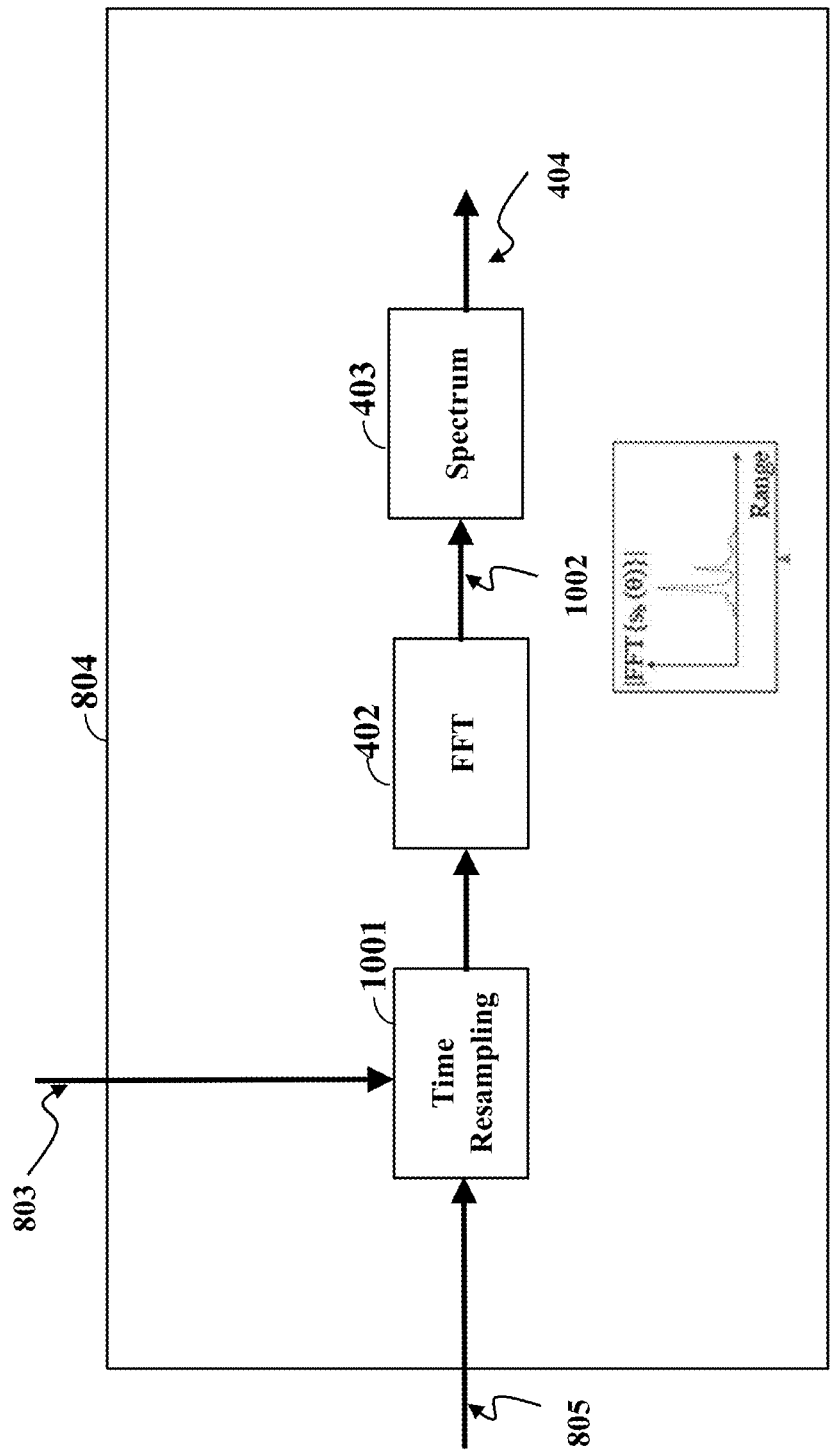
FIG. 10 is a block diagram illustrating a time-resampling based step to correct the beat signal with the estimated nonlinearity function, according to some embodiments.

FIG. 10 is a block diagram illustrating a time-resampling based step to correct the beat signal with the estimated nonlinearity function, according to some embodiments. Step 804 in FIG. 10 illustrates a nonlinearity correction approach using the beat signal from unknown reflectors 805 and the estimated nonlinearity function 803 from the reference beat signal. The Step 1001 resamples the original time index using the estimated polynomial nonlinearity function. The resampled beat signal is then transformed to the frequency domain 1002 by the FFT 402. The range information 404 of unknown reflectors can be determined by the spectrum 403 of resampled beat signal.

Figure 11:
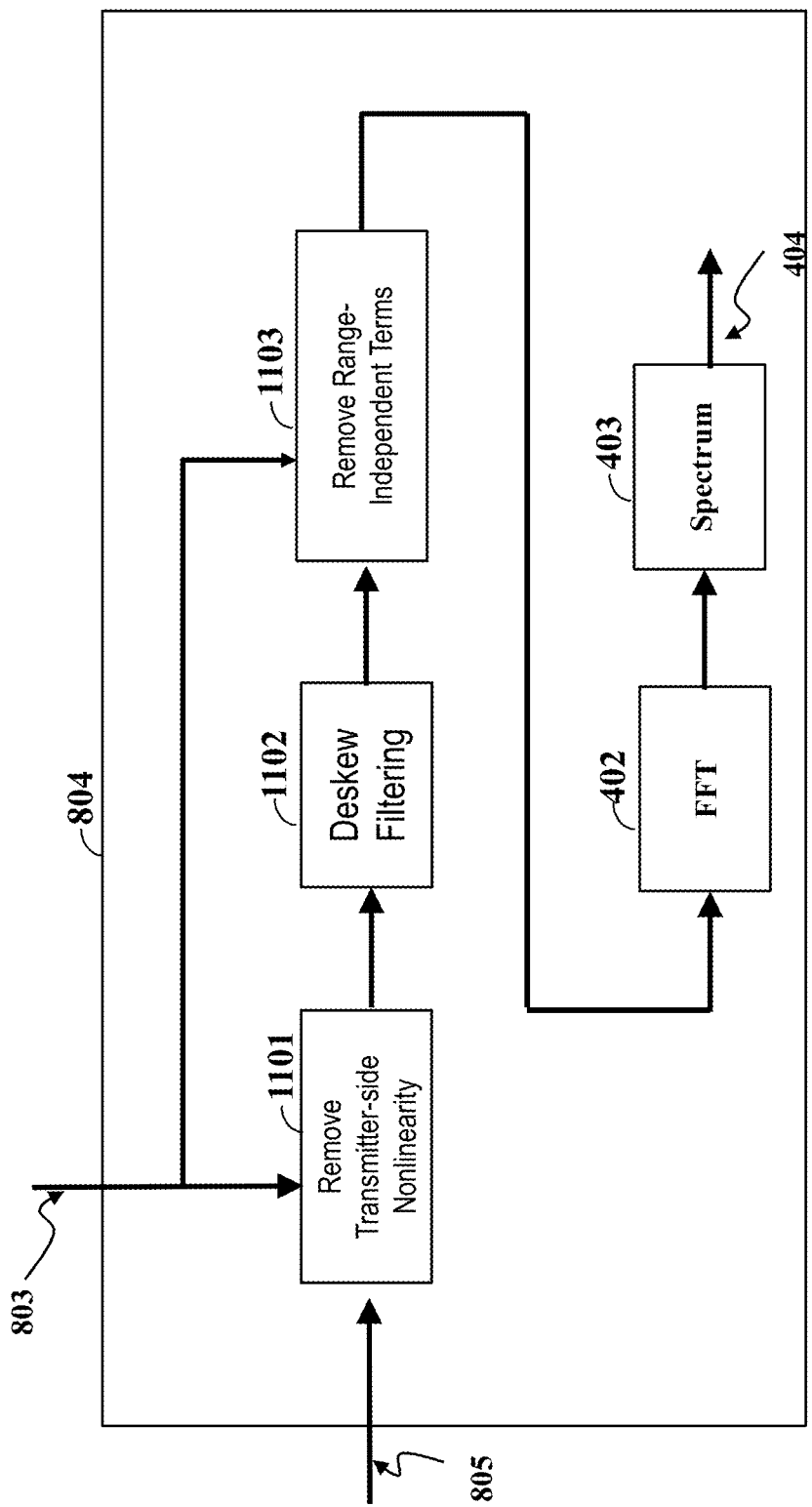
FIG. 11 is a block diagram illustrating a deskew filtering based step to correct the beat signal with the estimated nonlinearity function, according to some embodiments.

FIG. 11 is a block diagram illustrating a deskew filtering based step to correct the beat signal with the estimated nonlinearity function, according to some embodiments. Step 804 in FIG. 11 illustrates a different nonlinearity correction approach, still based on the beat signal from unknown reflectors 805 and the estimated nonlinearity function 803 from the reference beat signal. Step 1101 first removes the nonlinearity resulted from the transmitter side in the beat signal 805 using the estimated nonlinearity function 803. Step 1102 applies the deskew filter to the initially compensated beat signal. The deskew filter is to apply range-dependent/frequency-dependent time shifts to the input signal. In other words, the amount of time shifts are different for different frequency components. Since the frequency is directly related to the range for the beat signal, the deskew filter aims to compensate the range-dependent distortion for different reflectors such that the remaining distortion is range independent. Step 1103 removes the remaining range-independent distortion for all frequency/range with the help of the estimated nonlinearity function 803. The fully compensated beat signal is then transformed to the frequency domain by the FFT 402. The range information 404 of unknown reflectors can be determined by its spectrum 403.

Figures 12A, 12B:
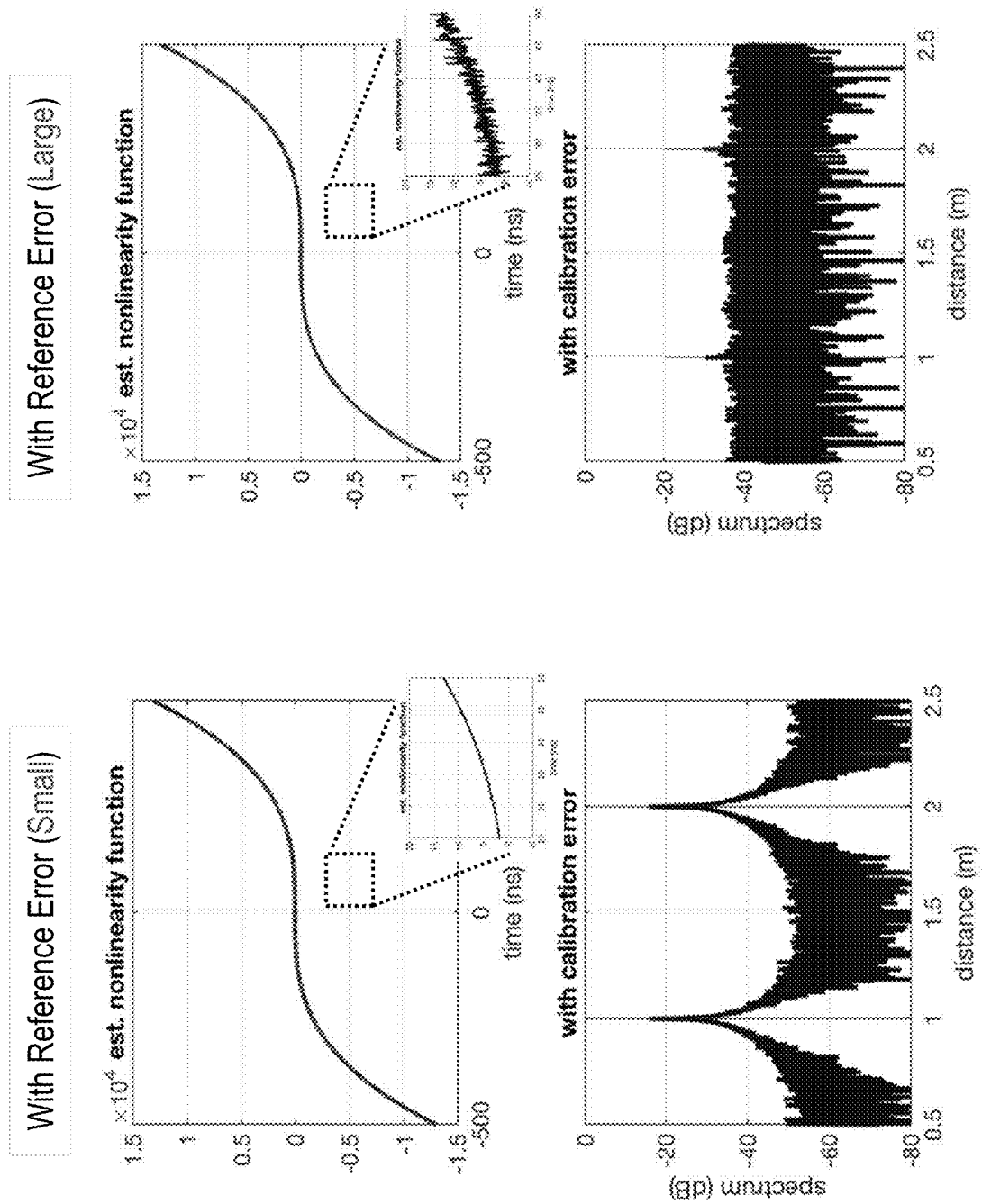
FIG. 12A is a schematic illustrating the effect of small nonlinearity function estimation errors on the distance estimation in the spectrum of the beat signal, according to some embodiments.
FIG. 12B is a schematic illustrating the effect of large nonlinearity function estimation errors on the distance estimation in the spectrum of the beat signal, according to some embodiments.

FIG. 12A is a schematic illustrating the effect of small nonlinearity function estimation errors on the spectrum of the beat signal according to some embodiments. Even with the reference beat signal from a known distance, the estimated nonlinearity function is still subject to estimation errors. With small nonlinearity estimation errors, as shown in the zoom-in window of FIG. 12A, the deskew-filter based nonlinearity correction approach is able to detect two strong reflectors at 1 m and, respectively, 2 m. However, the noise floor is increased compared with the case that the nonlinearity function is known perfectly.

FIG. 12B is a schematic illustrating the effect of large nonlinearity function estimation errors on the distance estimation in the spectrum of the beat signal according to some embodiments. With large nonlinearity estimation errors, as shown in the zoom-in window of FIG. 12B, the deskew-filter based nonlinearity correction approach is unable to declare the detection of two reflectors as the noise floor is almost at the same level of the magnitude of the reflectors.

Figure 13B:
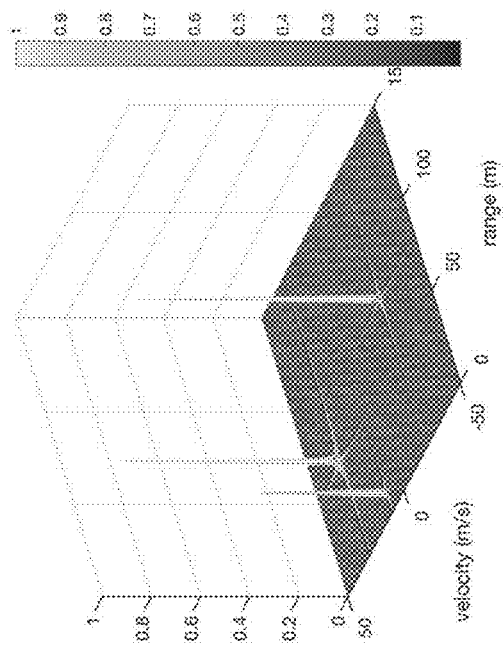
FIG. 13B is a schematic illustrating the two-dimensional FFT-based spectrum of the beat signal corresponding to three reflectors with different distances and velocities when the automotive radar transmits an ideal FMCW waveform, according to some embodiments.
Figure 13C:
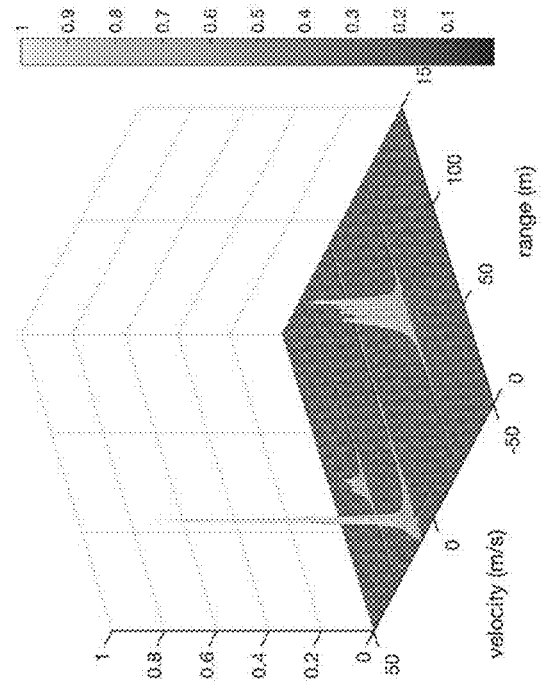
FIG. 13C is a schematic illustrating the two-dimensional FFT-based spectrum of the beat signal corresponding to three reflectors with different distances and velocities when the automotive radar transmits a perturbed FMCW waveform by a polynomial nonlinearity function, according to some embodiments.
Figure 13A:
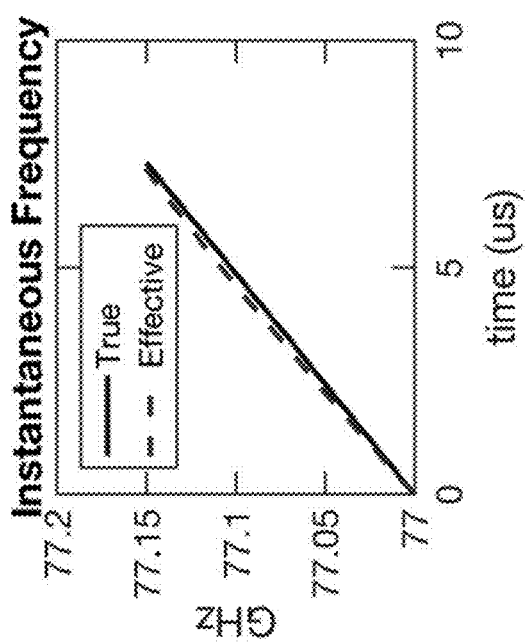
FIG. 13A is a schematic showing the difference between the ideal and perturbed FMCW waveform at 77 GHz used by automotive radars in the time-frequency domain when there is a polynomial nonlinearity, according to some embodiments.

FIG. 13A is a schematic showing the difference between the ideal and perturbed FMCW waveform at 77 GHz used by automotive radars in the time-frequency domain when there is a polynomial nonlinearity, according to some embodiments. It is seen that the perturbed FMCW waveform has effectively higher swept frequency at a given time, compared with the ideal FMCW waveform.

FIG. 13B is a schematic illustrating the two-dimensional FFT-based spectrum of the beat signal corresponding to three reflectors with different distances and velocities when the automotive radar transmits an ideal FMCW waveform. Three dominating peaks are clearly seen. Their coordinates give the distance and speed information of the three reflectors.

FIG. 13C is a schematic illustrating the two-dimensional FFT-based spectrum of the beat signal corresponding to three reflectors with different distances and velocities when the automotive radar transmits a perturbed FMCW waveform by a polynomial nonlinearity function. Notably, the effect of source nonlinearity is range-dependent, as spreads of the three peaks are different in the range-domain. In addition, the effect of source nonlinearity in the velocity domain appears to be negligible.

As discussed in relation to FIG. 1C, in some embodiments, the processor forms a function of unknown parameters, e.g., a basis function representing a complex sinusoidal signal, and determines the unknown parameters to reconstruct the distorted beat signal with the complex sinusoidal signal. In some implementations, the basis function is a polynomial phase basis function making the function of unknown parameters a polynomial function of unknown parameters with coefficients including the coefficients of the basis function and the distances. These embodiments enable a range estimation system and a method that can compensate for non-linearity of the modulated signal without relying on a dedicated reference system causing a known delay of the emitted signal.

Figure 14:
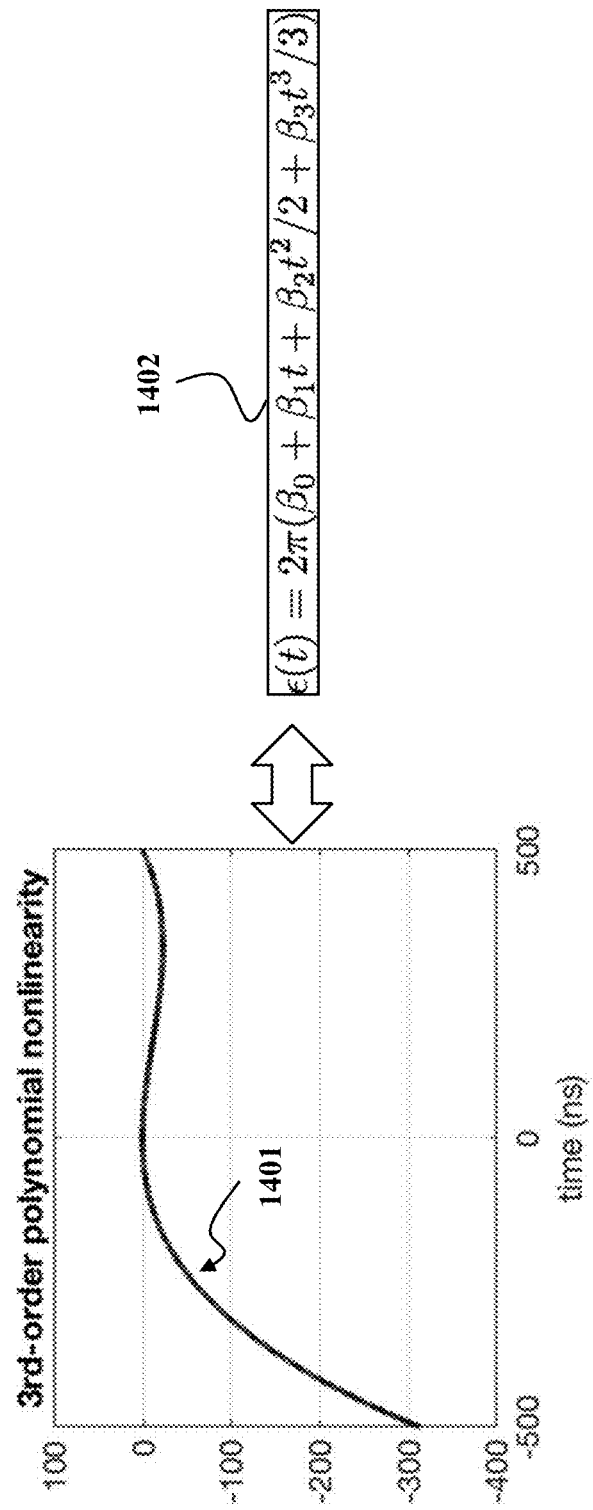
FIG. 14 is a schematic illustrating an example of a third-order polynomial nonlinearity function in the phase domain and the mathematical definition of third-order polynomial nonlinearity function, according to some embodiments.

FIG. 14 is a schematic illustrating an example of a third-order polynomial nonlinearity function 1401 in the phase domain used by some embodiments. In this example, the mathematical definition of third-order polynomial nonlinearity function parametrize the source nonlinearity function over the polynomial basis with unknown coefficients. Specifically, the polynomial parametric model 1402 of the source nonlinearity function in the phase of the transmitted signal means that the nonlinearity function can be approximated in the basis of $t^0$, $t^1$, $t^2$, $t^3$ with proper coefficients $\beta_0$, $\beta_1$, $\beta_2$, $\beta_3$. According to the Weierstrass theorem, any smooth function over a closed interval can be approximated by a polynomial function as close as possible. Therefore, as long as the nonlinearity function is smooth over a period of time, one can approximate the nonlinearity function with the polynomial model. If the period of time increases, the order of polynomial function may be higher. With this polynomial model of the nonlinearity function, there is no need to estimate each value of the unknown nonlinearity function. Instead, some embodiments estimate the polynomial coefficients $\beta$ to reconstruct the nonlinearity function and to recover the source nonlinearity function from the reference beat signal.

Figure 15:
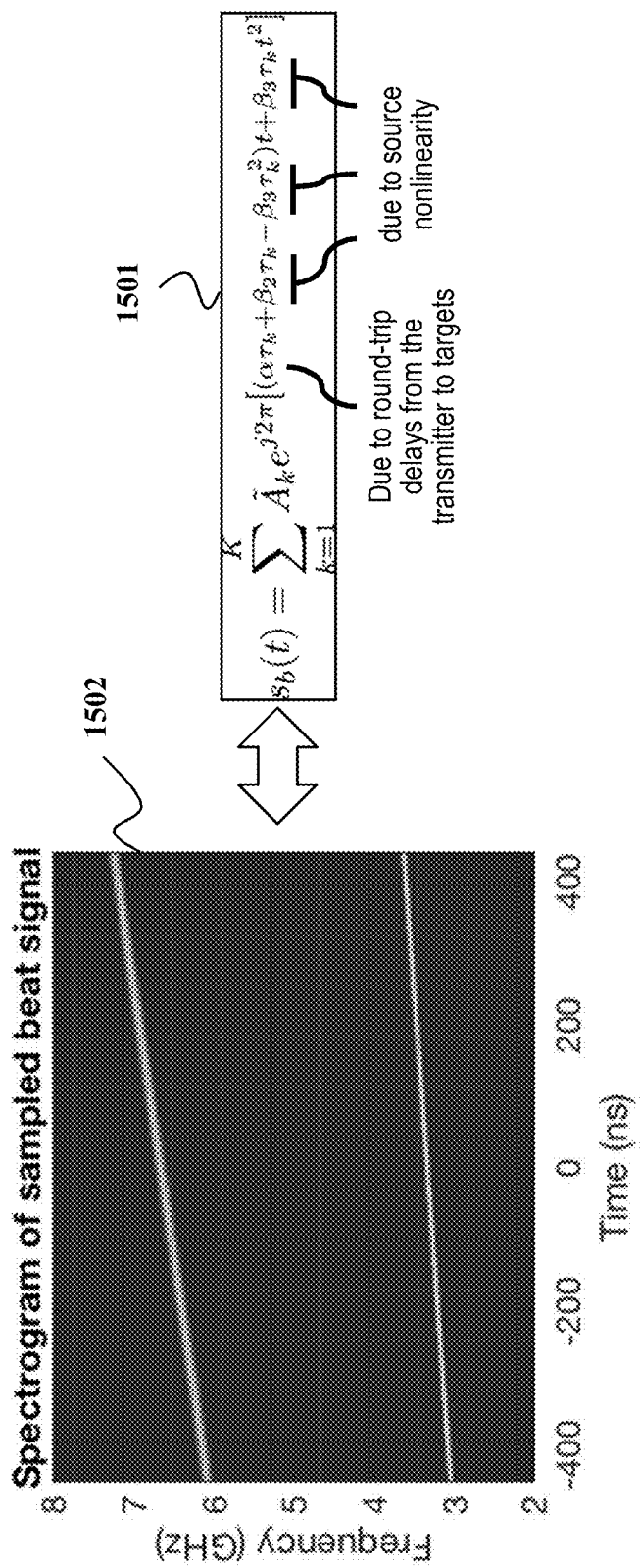
FIG. 15 is a schematic illustrating an example of the spectrogram of the beta signal of two reflectors with a third-order polynomial nonlinearity function and its mathematical definition of the resulting beat signal, according to some embodiments.

FIG. 15 is a schematic illustrating an example of the spectrogram 1502 of the beta signal of two reflectors with a third-order polynomial nonlinearity function and its mathematical definition of the resulting beat signal used by some embodiments. As opposed to the use of a dedicated reference channel with additional hardware costs and error propagation (as shown in FIG. 12A and FIG. 12B), the proposed reference-free approach directly works on the beat signal from unknown reflectors. In order to achieve this goal, it builds on the parametric modeling of the source nonlinearity function, e.g., the polynomial model. Specifically, if the source nonlinearity function can be approximated by a third-order polynomial function with unknown coefficients $(\beta_0, \beta_1, \beta_2, \beta_3)$, the beat signal $s_b(t)$ of multiple (K) reflectors with round-trip delays $\tau_k$ can be mathematically described by Equation 1501, where $A_k$ is the reflected amplitude. The unknown delays (or, equivalently, distances) $\tau_k$ and polynomial coefficients $(\beta_0, \beta_1, \beta_2, \beta_3)$ appear in the phase of each component of the beat signal, along with the known sweeping rate $\alpha$. Therefore, if we can recover these unknown parameters in the phase of the beat signal, we can recover the distances $\tau_k$ of multiple reflectors as well as the source nonlinearity function via the estimated polynomial coefficients $(\beta_0, \beta_1, \beta_2, \beta_3)$. It follows from Equation 1501 that, each component of the beat signal (within the summation) is a linear FM or chirp signal with a new center frequency (in t) as a function of the sweeping rate $\alpha$, the distance $\tau_k$ and two polynomial coefficients $(\beta_2, \beta_3)$ and a new sweeping rate (in $t^2$) as a function of the distance $\tau_k$ and the polynomial coefficient $(\beta_3)$. This is verified by the spectrogram of the beat signal for two (K=2) reflectors with a third-order polynomial nonlinearity function. The spectrogram clearly shows two chirp components with different sweeping rates $(\beta_3 \tau_k)$ and center frequencies.

Figure 16:
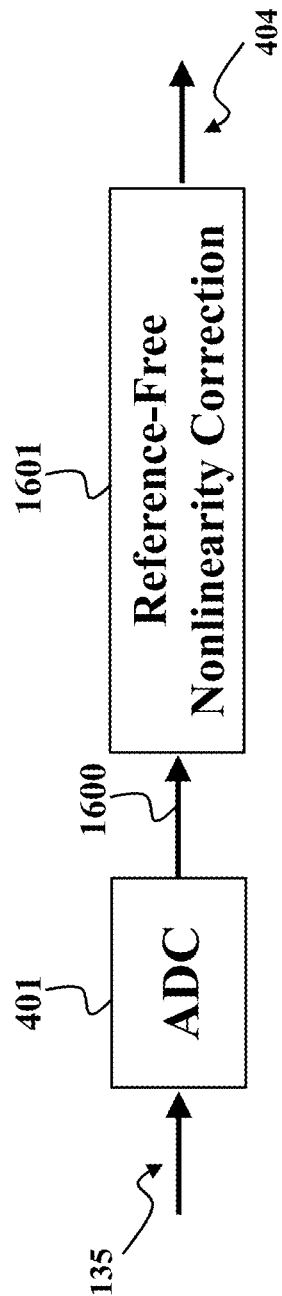
FIG. 16 is a block diagram illustrating the reference-free nonlinearity correction approach, according to some embodiments.

FIG. 16 is a block diagram illustrating the reference-free nonlinearity correction used for range estimation by some embodiments. Compared with the reference-based approach in FIG. 8, which requires a reference beat signal 803, the reference-free nonlinearity correction only requires the digital beat signal 135 from multiple unknown reflectors. The ADC 401 samples the analog beat signal 135 into the digital signal 1600. Correction 1601 aims to simultaneously recover the delay (or distance) parameters of multiple reflectors and the parametric coefficients of the source nonlinearity function directly from the beat signal. One choice of the parametric model of the source nonlinearity function is the polynomial basis. After the delay parameters are estimated, the embodiments can output the range information 404 of multiple reflectors.

Figure 17:
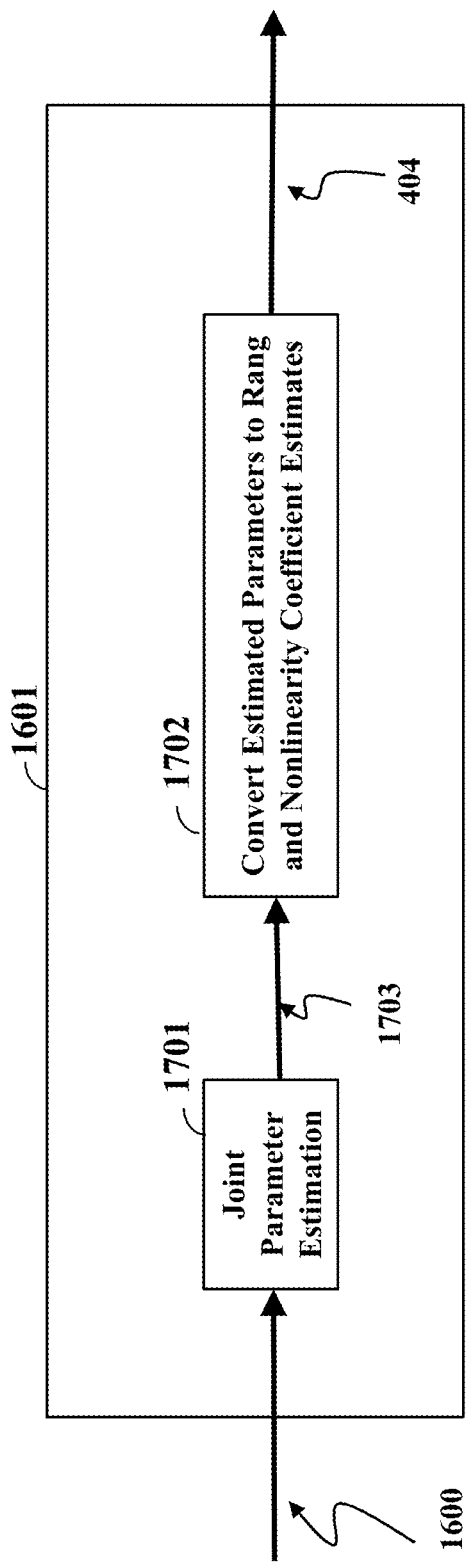
FIG. 17 is a block diagram illustrating the joint parameter estimation step and the conversion step used in the reference-free nonlinearity correction approach, according to some embodiments.

FIG. 17 is a block diagram illustrating the joint parameter estimation step and the conversion step used in the reference-free nonlinearity correction according to embodiments. The reference-free nonlinearity correction includes two steps: Step 1701 uses the digital beat signal to jointly estimate the unknown phase parameters from multiple signal components and outputs the estimated phase parameters for all signal components. For example, of a third-order polynomial nonlinearity function, Step 1701 estimates all center frequencies and sweeping rates of all K signal components in Equation 1501 directly from the beat signal. The next step 1702 converts the K sets of estimated phase parameters to the delay parameters of K reflectors and parametric coefficients of the source nonlinearity function. The range information 404 is obtained from the converted delay parameters.

Figure 18:
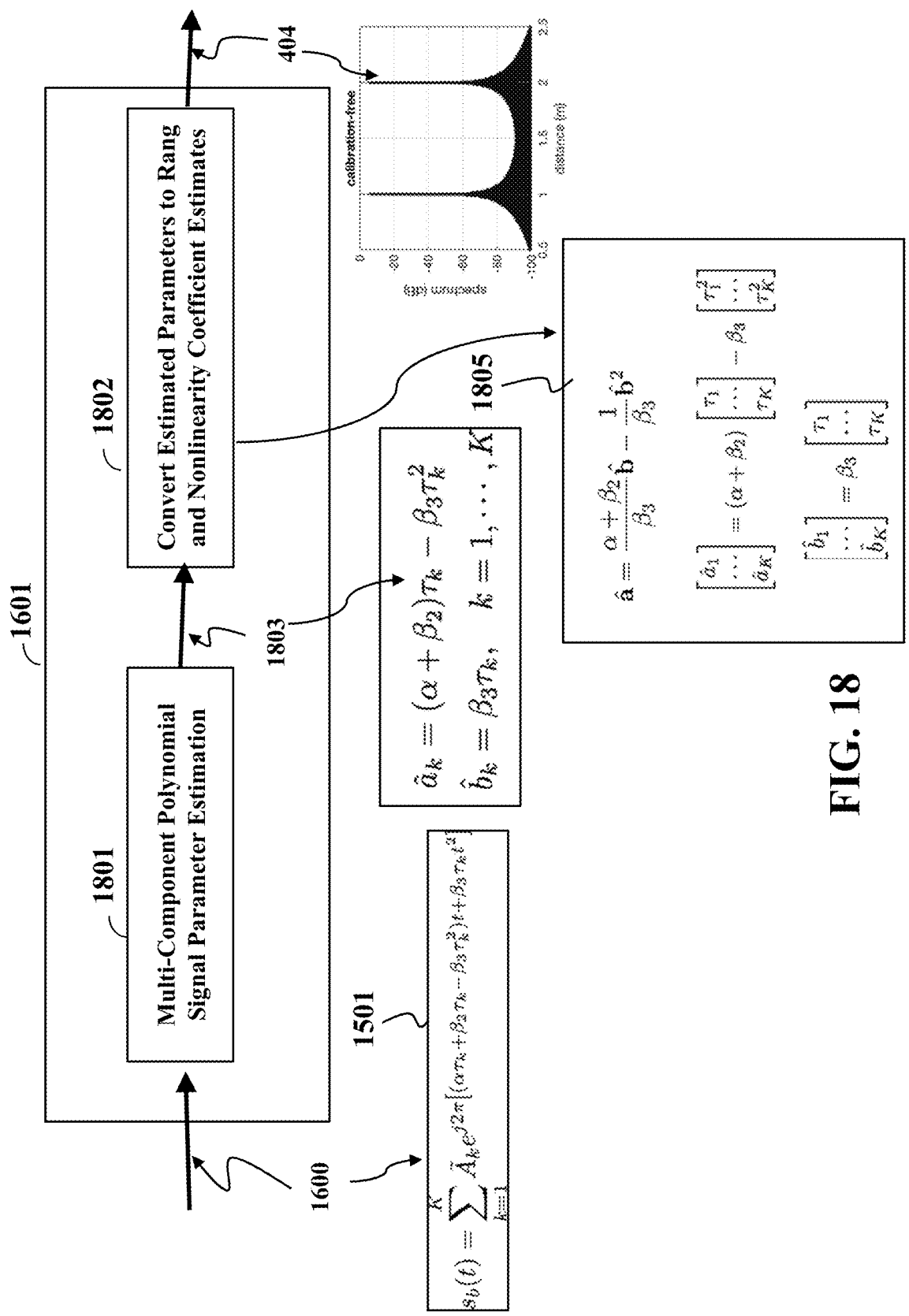
FIG. 18 is a block diagram illustrating the reference-free nonlinearity correction approach based on a polynomial model for the source nonlinearity function, according to some embodiments.

FIG. 18 is a schematic illustrating the reference-free nonlinearity correction approach based on a third-order polynomial model for the source nonlinearity function according to embodiments. Given that the source nonlinearity function is a third-order polynomial function, the beat signal 1600 is represented with a mathematical expression of Equation 1501. According to this mathematical expression, Step 1801 makes use of various estimation methods to recover the phase parameters of a multi-component polynomial phase signal, and outputs the estimated center frequencies $a_k$ and sweeping rates $b_k$. The estimated center frequencies and sweeping rates are related to the delay parameters and parametric coefficients in Equation 1803. Step 1802 converts the K sets of estimated phase parameters to the delay parameters of K reflectors and parametric coefficients of the source nonlinearity function using the listed equations 1805. The range information 404 is obtained from the converted delay parameters.

Figure 19:
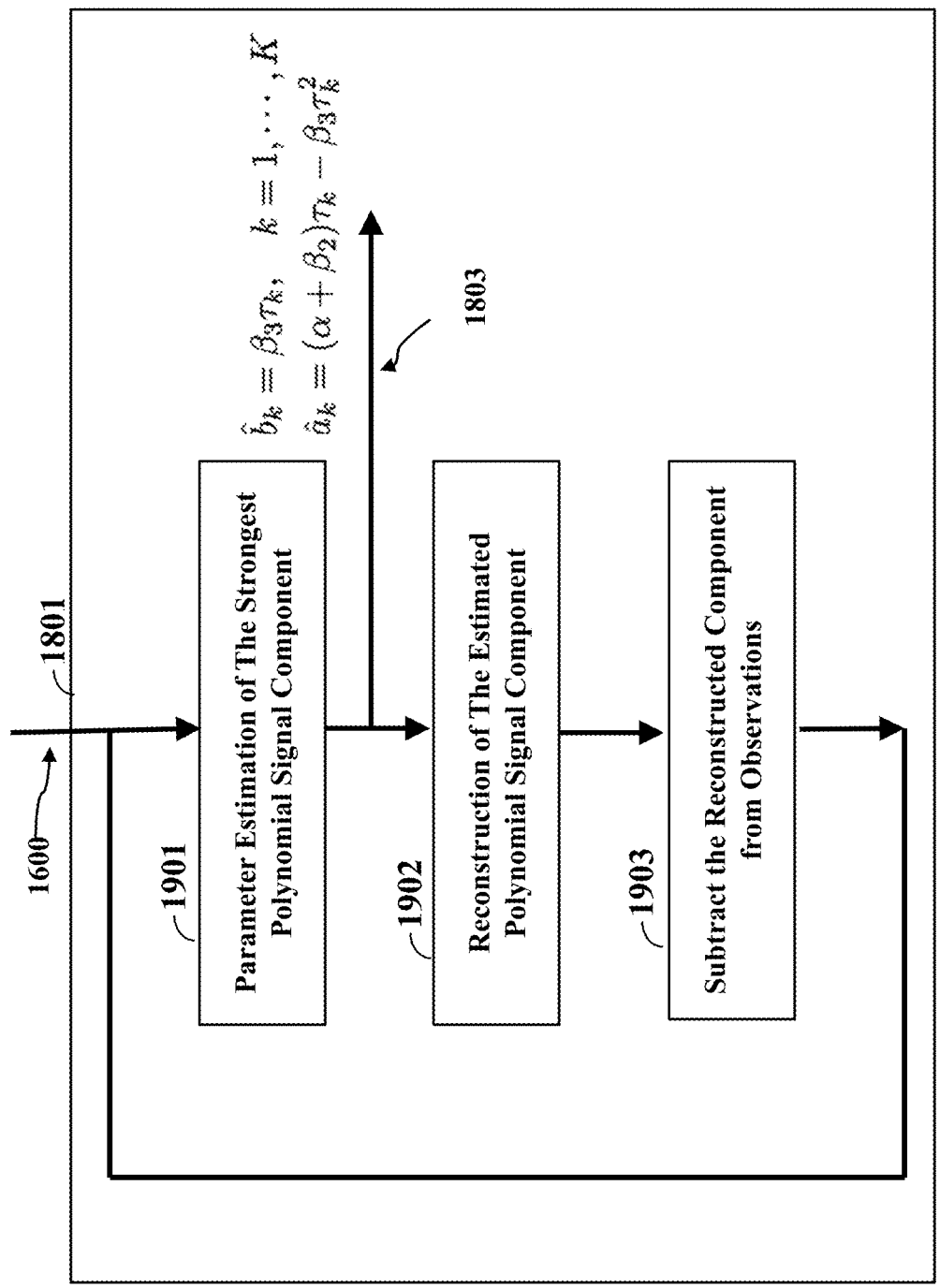
FIG. 19 is a block diagram illustrating the joint parameter estimation of a multi-component polynomial phase signal used by the reference-free nonlinearity correction approach in FIG. 18, according to some embodiments.

FIG. 19 is a block diagram illustrating the joint parameter estimation of a multi-component polynomial phase signal used by the reference-free nonlinearity correction in FIG. 18 according to some embodiments. Step 1801 in FIG. 19 illustrates a procedure to estimate the phase parameters of each component in the beat signal in an iterative fashion. It starts with Step 1901 which focuses on the strongest component in the beat signal and only outputs the estimated phase parameters corresponding to the strongest component. Step 1902 reconstructs the time-domain waveform of the strongest component using the estimated phase parameters, and Step 1903 removes the contribution of the strongest component from the beat signal and exposes the next significant component. The procedure repeats on the new beat signal. Therefore, Step 1901 outputs the phase parameters of the strongest component in the remaining beat signal only once for one iteration. After K iterations, all K sets of phase parameters 1803 can be obtained.

Exemplar Formulation

Consider an FMCW sensing system transmitting a unit-magnitude linearly frequency modulated signal in the form of $$s_t(t) = e^{j2\pi(f_c t + 0.5\alpha t^2 + \varepsilon(t))}, \tag{1}$$

where t is the time variable, $f_c$ is the carrier frequency, $\alpha$ is the frequency sweep rate or chirp rate, and $\varepsilon(t)$ is the source nonlinearity phase function. For a perfectly linearly swept source, $\varepsilon(t)=0$. An example of linear frequency modulated transmitted signal is shown in FIG. 4 B-D. FIGS. 4 B &C show, respectively, the time-domain and time-frequency representations of a linearly frequency modulated signal.

For a stationary reflector at a distance of R, the received signal is a delayed and attenuated/enhanced copy of the transmitted signal $$s_r(t) = As_t(t - \tau) = Ae^{j2\pi(f_c(t-\tau)+0.5\alpha(t-\tau)^2+\varepsilon(t-\tau))}, \quad (2)$$

where A is proportional to the reflectivity of the stationary target, and $\tau=2R/c$ is the time delay. FIG. 4C shows that the time-frequency representation of the received signal is shifted to the right of the transmitted time-frequency pattern with a delay of $\tau$. It is then mixed with the transmitted signal to generate the beat signal.

$$s_b(t) = s_r(t)s_t^*(t) = Ae^{j2\pi(f_c\tau+\alpha\tau t-0.5\alpha\tau^2+(\varepsilon(t)-\varepsilon(t-\tau)))}, \quad (3)$$

where s* denotes the complex conjugate of s.

With a perfect linearly swept source, $\varepsilon(t)-\varepsilon(t-\tau)=0$ in (3) and the beat signal is a complex sinusoidal signal with $f_b=\alpha\tau$ (or, equivalently, angular frequency $\omega_b=2\pi\alpha\tau$). FIG. 4D shows the time-domain waveform of a beat signal corresponding to a single target when there is no source nonlinearity. FIG. 4E shows the corresponding spectrum with a dominant peak which gives an estimate of $f_b$ and, hence, the time delay $\tau$. With the estimate of $\tau$, one can recover the distance R via $R=c\tau/2$.

With the source nonlinearity $\varepsilon(t)$ is present, the beat signal in (3) is no longer a sinusoidal signal due to $\varepsilon(t)-\varepsilon(t-\tau)\neq 0$ in the phase. As a result, the spectrum peak of beat signal is spread, resulting in degradation in the range resolution and signal-to-noise ratio (SNR). FIG. 6C shows the time-frequency spectrum of a linearly swept source subject to a sinusoidal nonlinearity. Its impact on the range estimation is clearly seen in FIG. 6D as the spectrum peak spreads with multiple fine peaks.

Some implementations extends the above analysis to the case of K>1 reflectors at distances of $R_1, \ldots, R_K$. With the same transmitting signals in (1), the received signal is given as $$s_r(t) = \sum_{k=1}^{K} A_k s_t(t - \tau_k) = \sum_{k=1}^{K} A_k e^{j2\pi(f_c(t-\tau_k)+0.5\alpha(t-\tau_k)^2+\varepsilon(t-\tau_k))}, \quad (4)$$

the beat signal is given as $$s_b(t) = \sum_{k=1}^{K} A_k e^{j2\pi(f_c\tau_k+\alpha\tau_k t-0.5\alpha\tau_k^2+(\varepsilon(t)-\varepsilon(t-\tau_k)))}. \quad (5)$$

When $\varepsilon(t)=0$, the beat signal consists of multiple sinusoidal signals with frequencies $f_{b_k}=\alpha\xi_k$. In the case of source nonlinearity, the resulting phase distortion at the beat signal is range dependent due to the term $\varepsilon(t)-\varepsilon(t-\tau_k)$. FIGS. 7A&B show a third-order polynomial nonlinearity function and its impact on the range estimation of two reflectors is shown in FIG. 7D. It is worth noting the range-dependent nonlinearity distortion in FIG. 7D where the spectrum distortions for the two reflectors are different.

The problem of interest here is to estimate the delay parameters $\tau_i$ when the source nonlinearity function $\varepsilon(t)$ is present.

Some computational methods for nonlinearity correction use a known reference point. Particularly, one method approximates the phase error term $\varepsilon(t)-\varepsilon(t-\tau_{ref})$ using a first-order local expansion $$\varepsilon(t)-\varepsilon(t-\tau_{ref})\approx\tau_{ref}\varepsilon'(t) \quad (6)$$

where $\tau_{ref}$ is the delay from a reference (i.e., a delay line or reflector at a known distance) and it is usually small to make the local expansion valid. Plugging (6) back to (3) and given that $\tau_{ref}$ is known, we can estimate $\varepsilon'(t)$ from the phase of reference beat signal $s_b(t)$. In other words, using a reference, one can estimate the first-derivative of the source nonlinearity function, $\hat{\varepsilon}'(t)$, as a function of t, provided that $|t-\tau_{ref}|$ is limited. Therefore, the nonlinearity-induced phase error term for reflectors can be approximated using the estimated $\hat{\varepsilon}'(t)$ $$\varepsilon(t)-\varepsilon(t-\tau)\approx\tau\hat{\varepsilon}'(t), |t-\tau_{ref}|\leq\zeta, \quad (7)$$

where $\zeta$ is a small quantity. Then, it can be compensated with the estimated $\hat{\varepsilon}'(t)$ by using the concept of time warping, provided that the delay $\tau$ is small compared to the highest frequency component in the nonlinearity function.

It is noted that the condition of applying the time warping is no longer valid when the range interval of interest increases. Also in the long-range OFDR application, it is noted that the approximation error in (7) aggregates along with longer measurement distances.

The above limitation to the short-range application was removed by the deskew-filter nonlinearity correction algorithm. Still built on an estimate of the source nonlinearity function $\hat{\varepsilon}(t)$ (note that the local phase derivative $\hat{\varepsilon}'(t)$), it removes the nonlinearity effects in the beat signal in the entire range of interest. Particularly, it consists of three steps in FIG. 11. First, the source nonlinearity term $\varepsilon(t)$ originated from the transmitter side is removed from the beat signal of (3) $s_2(t)=s_b(t)e^{-j2\pi\hat{\varepsilon}(t)}$ $$\approx Ae^{j2\pi(f_c\tau+\alpha\tau t-0.5\alpha\tau^2-\varepsilon(t-\tau))} \quad (8)$$

Then, a deskew filtering with range-dependent time shifts is introduced to the above initially compensated $s_2(t)$. Particularly, the range-dependent time shifts can be simply realized in the frequency by multiplying the term of $e^{j\pi f^2/\alpha}$ $$s_3(t) = F^{-1}\left\{s_2(f)e^{j\pi\frac{f^2}{\alpha}}\right\} = Ae^{j2\pi(f_c\tau+\alpha\tau t)-\varepsilon_{RVP}(t)} = Ae^{j2\pi(f_c\tau+\alpha\tau t)}s_{RVP}^*(t) \quad (9)$$

where $F^{-1}$ denotes the inverse Fourier transform, $s_2(f)$ is the spectrum of the signal $s_2(t)$, RVP stands for Residual Video Phase, $s_{RVP}^*(t)$ is complex conjugate of $S_{RVP}(t)$ and $$s_{RVP}(t) = e^{j2\pi\varepsilon_{RVP}(t)} = F^{-1}\left\{F(e^{j2\pi\hat{\varepsilon}(t)})e^{j\pi\frac{f^2}{\alpha}}\right\} \quad (10)$$

Since $\hat{\varepsilon}(t)$ is known, so is $s_{RVP}(t)$. Therefore, the last step is to compensate $s_{RVP}(t)$ in $s_3(t)$.

$$s_4(t)=s_3(t)s_{RVP}(t)=Ae^{2\pi(f_c\tau+\alpha\tau t)} \quad (11)$$

which is now a complex sinusoidal signal with a frequency at $\alpha\tau$.

The reference-based approaches require a step to estimate the source nonlinearity function estimation $\varepsilon(t)$ from the beat signal corresponding to a given reference, e.g., a delay line or response from a reflector at a known distance. The local approximation for estimating ε(t) limits the applicability to short-range applications. To improve the estimation accuracy of ε(t), a method uses a parametric model, i.e., a polynomial function, to describe the nonlinearity source function which is a time-varying smooth function, and then estimate the parametric model coefficients from the response of a reference. However, estimation errors from the source nonlinearity estimation propagate to the phase compensation step for the range estimation. The top row of FIGS. 12A & B shows two estimated source nonlinearity function ε(t), a third-order PPS, in the OCT application. Two point targets are placed at 1 m and, respectively, 2 m away from the source.

When there are errors from the estimation of ε(t), it is evident from FIGS. 12A & B that the range estimation performance degrades. In particular, FIG. 12B shows severe performance degradation in the range estimation when the estimation of ε(t) has large errors.

To that end, some embodiments use a reference-free computational nonlinearity correction to mitigate the effect of source nonlinearity on the range estimation. Still relying on a parametric modeling, not limited to the polynomial phase signal model, the embodiments aims to estimate 1) the source nonlinearity function ε(t) and 2) the range information of reflectors simultaneously from the beat signal. The embodiments uses the understanding that, given a parametric model for the source nonlinearity function ε(t), the response from a reflector carries the information on the reflector-dependent range/delay parameter $\tau_i$ and the source nonlinearity function ε(t) (and, hence, ε(t−$\tau_i$)). With M reflectors, the beat signal is the sum of M responses characterized by M delay parameters $\{\tau_i\}_i^M$ and the common source nonlinearity function ε(t).

Exploratory Case Study:

the source nonlinearity function ε(t) is given by a third-order polynomial phase signal, $$\varepsilon(t)=2\pi(\beta_0+\beta_1 t+\beta_2 t^2/2+\beta_3 t^3/3!), \quad (12)$$

where $\{\beta_p\}_{p=0}^3$ are unknown model coefficients. Replacing ε(t) in (5) with the above parametric model, we have $$s_b(t)=\sum_{k=1}^{K}\tilde{A}_k e^{j2\pi[(\alpha\tau_k+\beta_2\tau_k-0.5\beta_3\tau_k^2)t+0.5\beta_3\tau_k t^2]} \quad (13)$$

where $$\tilde{A}_k = A_k e^{j2\pi[f_c\tau_k-0.5\alpha\tau_k^2+\beta_1\tau_k-0.5\beta_2\tau_k^2+\beta_3\tau_k^3/3!]}.$$

It is seen from (13) that the resulting beat signal $s_b(t)$ from K reflectors is a K-component chirp signal with each component characterized by the weighted complex amplitude Ã, the center frequency ($\alpha\tau_k+\beta_2\tau_k-0.5\beta_3\tau_k^2$), and the chirp rate $0.5\beta_3\tau_k$. Then, multi-component chirp parameter estimation can be directly applied to estimate the three parameters of each of K reflectors.

Denote the following chirp parameter estimates from a multi-component chirp parameter estimation algorithm $$\hat{a}_k=(\alpha+\beta_2)\tau_k-0.5\beta_3\tau_k^2,$$

$$\hat{b}_k=0.5\beta_3\tau_k, \quad k=1,\ldots,K \quad (14)$$

Given these K pairs of chirp parameters $\{\hat{a}_k, \hat{b}_k\}$, we recover K range parameters $\tau=[\tau_1, \ldots, \tau_K]^T$ and the nonlinearity model coefficients $\{\beta_p\}_{p=1}^3$ as follows. First, group all K pairs of chirp parameter estimates as $$a=(\alpha+\beta_2)\tau-0.5/\beta_3(\tau e \tau)$$

$$b=0.5\beta_3\tau \quad (15)$$

where $a=[\hat{a}_1, \ldots, \hat{a}_K]^T$, $b=[\hat{b}_1, \ldots, \hat{b}_K]^T$, and e denote the element-wise Hadamard product. The above equation is further equivalent to $$a = \frac{2(\alpha+\beta_2)}{\beta_3}b - \frac{2}{\beta_3}(beb) \triangleq \gamma_1 b + \gamma_2(beb), \quad (16)$$

where $\gamma=[\gamma_1,\gamma_2]^T$ can be estimated as $$\hat{\gamma}=[\hat{\gamma}_1,\hat{\gamma}_2]^T=(B^T B)^{-1}B^T a \quad (17)$$

with B=[b, beb]. Therefore, we can estimate $(\alpha+\beta_2)$ and $\beta_3$ as $$\hat{\alpha}+\hat{\beta}_2=-\hat{\gamma}_1\hat{\gamma}_2^{-1},$$

$$\hat{\beta}_3=-2\hat{\gamma}_2^{-1} \quad (18)$$

and the range parameter τ can be estimated as $$\hat{\beta}=2\beta_3^{-1}b=-\hat{\gamma}_2 b. \quad (19)$$

FIG. 15 shows the spectrogram of the beat signal of (13) when the source nonlinearity function is the same third-order polynomial function. As shown in (13), the beat signal includes of two chirps signals with the center frequency $(\alpha\tau_k+\beta_2\tau_k-0.5\beta_3\tau_k^2)$ and chirp rate $0.5\beta_3\tau_k$.

Generalization to an Arbitrary Order:

some embodiments generalize the parametric polynomial function model of the source nonlinearity function ε(t) into an arbitrary order P, $$\varepsilon(t) = 2\pi\sum_{p=0}^{P}\beta_p\frac{t^p}{p!}, \quad (20)$$

where $\{\beta_p\}_{p=0}^P$ are unknown model coefficients. Given a delay of $\tau_k$, the nonlinearity induced phase error term in the beat signal is given as $$\varepsilon(t)-\varepsilon(t-\tau_k)=2\pi\sum_{p=0}^{P}\beta_p\frac{t^p}{p!}-2\pi\sum_{p=0}^{P}\beta_p\frac{(t-\tau_k)^p}{p!}. \quad (21)$$

The Binomial expansion gives $$(t-\tau_k)^p \sum_{l=0}^{P}\binom{p}{l}(-\tau_k)^l t^{p-l}, \quad (22)$$

which leads to $$\frac{\varepsilon(t-\tau_k)}{2\pi} = \sum_{p=0}^{P}\beta_p\frac{(t-\tau_k)^p}{p!} \quad (23)$$

-continued $$= \sum_{p=0}^{P} \frac{\beta_p}{p!} \sum_{l=0}^{p} \binom{p}{l}(-\tau_k)^l t^{p-l}$$

$$= \sum_{l=0}^{P} \left[ \sum_{m=0}^{l} \binom{P-m}{l-m}(-\tau_k)^{l-m} \frac{\beta_{P-m}}{(P-m)!} \right] t^{P-l}$$

$$= \sum_{l=0}^{P} \left[ \underbrace{\binom{P-l}{0}(-\tau_k)^0 \frac{\beta_{P-l}}{(P-l)!}}_{m=l} + \underbrace{\sum_{m=0}^{l-1} \binom{P-m}{l-m}(-\tau_k)^{l-m} \frac{\beta_{P-m}}{(P-m)!}}_{m<l} \right] t^{P-l}$$

$$= \sum_{l=0}^{P} \frac{\beta_{P-l}}{(P-l)!} t^{P-l} + \sum_{l=1}^{P} \left[ \sum_{m=0}^{l-1} \binom{P-m}{l-m}(-\tau_k)^{l-m} \frac{\beta_{P-m}}{(P-m)!} \right] t^{P-l}$$

$$= \sum_{p=0}^{P} \frac{\beta_p}{p!} t^p + \sum_{l=1}^{P} \left[ \sum_{m=0}^{l-1} \binom{P-m}{l-m}(-\tau_k)^{l-m} \frac{\beta_{P-m}}{(P-m)!} \right] t^{P-l}.$$

As a result, the phase term in (21) can be simplified as follows $$\frac{\varepsilon(t) - \varepsilon(t - \tau_k)}{2\pi} = -\sum_{l=1}^{P} \left[ \sum_{m=0}^{l-1} \binom{P-m}{l-m}(-\tau_k)^{l-m} \frac{\beta_{P-m}}{(P-m)!} \right] t^{P-l} \quad (24)$$

$$= -\underbrace{\sum_{m=0}^{P-1} \binom{P-m}{P-m}(-\tau_k)^{P-m} \frac{\beta_{P-m}}{(P-m)!}}_{l=P} -$$

$$\underbrace{\sum_{l=1}^{P-1} \left[ \sum_{m=0}^{l-1} \binom{P-m}{l-m}(-\tau_k)^{l-m} \frac{\beta_{P-m}}{(P-m)!} \right] t^{P-l}}_{l<P}$$

$$= -\sum_{m=0}^{P-1}(-\tau_k)^{P-m} \frac{\beta_{P-m}}{(P-m)!} -$$

$$\sum_{l=1}^{P-1} \left[ \sum_{m=0}^{l-1} \binom{P-m}{l-m}(-\tau_k)^{l-m} \frac{\beta_{P-m}}{(P-m)!} \right] t^{P-l},$$

which is the sum of K polynomial functions of order P−1 on t with the l-th coefficients $$\gamma_{k,0} = -\sum_{m=0}^{P-1}(-\tau_k)^{P-m} \frac{\beta_{P-m}}{(P-m)!} \quad (25)$$

$$\gamma_{k,P-l} = -\sum_{m=0}^{l-1}\binom{P-m}{l-m}(-\tau_k)^{l-m}\frac{\beta_{P-m}}{(P-m)!} = -\sum_{m=0}^{l-1}\frac{\beta_{P-m}}{(l-m)!(P-l)!}(-\tau_k)^{l-m}.$$

Therefore, $$s_b(t) = \sum_{k=1}^{K} \tilde{A}_k e^{j2\pi[(\alpha\tau_k + \gamma_{k,1})t + \gamma_{k,2}t^2 + \ldots + \gamma_{k,P-1}t^{P-1}]} \quad (26)$$

where $\tilde{A}_k = A_k e^{j2\pi(f_c \tau_k - 0.5\alpha\tau_k^2 - \gamma_{k,0})}$.

It is follows from (26) that the beat signal is now a sum of K polynomial phase signals of order P−1 with p-th coefficient $\gamma_{k,p-1}$ (except the first-order coefficient $\gamma_{k,1} + \alpha\tau_k$) and the amplitude $\tilde{A}_k$. Therefore, we can apply the state-of-art PPS parameter estimation algorithms to extract the phase parameters.

Denote the estimated coefficients as $$\hat{\zeta}_{k,1} = \alpha\tau_k + \gamma_{k,1} = \alpha\tau_k - \sum_{m=0}^{P-2} \frac{\beta_{P-m}(-\tau_k)^{P-1-m}}{(P-1-m)!}, \quad (27)$$

$$\hat{\zeta}_{k,P-l} = \gamma_{k,P-l} = -\sum_{m=0}^{l-1} \frac{\beta_{P-m}(-\tau_k)^{l-m}}{(l-m)!(P-l)!}, \quad (28)$$

where l=1, . . . , P−2. With these K(P−1) estimated coefficients $\hat{\zeta}_{k,p}$, we can then recover the delay parameter $\tau_k$ and the nonlinearity parametric coefficients $\beta_p$.

Considering Equations (27) and (28), when l=1, according to (28), $$\hat{\zeta}_{k,P-1} = \gamma_{k,P-1} = \frac{\beta_P}{(P-1)!}\tau_k, \quad (29)$$

which leads to $$\hat{\zeta}_{P-1} = \begin{bmatrix} \hat{\zeta}_{1,P-1} \\ \vdots \\ \hat{\zeta}_{K,P-1} \end{bmatrix} = \frac{\beta_P}{(P-1)!}\tau \rightarrow \tau = \frac{(P-1)!}{\beta_P}\hat{\zeta}_{P-1}. \quad (30)$$

When l=2, . . . , P−2, according to (28), $$\hat{\zeta}_{P-l} = \begin{bmatrix} \hat{\zeta}_{1,P-l} \\ \vdots \\ \hat{\zeta}_{K,P-l} \end{bmatrix} = \sum_{m=0}^{l-1} -\frac{\beta_{P-m}}{(l-m)!(P-l)!}(-\tau)^{\circ(l-m)} \quad (31)$$

-continued $$= \sum_{m=0}^{l-1}(-1)^{l-m+1}\frac{[(P-1)!]^{l-m}\beta_{P-m}}{\beta_P^{l-m}(l-m)!(P-l)!}\underbrace{\hat{\zeta}_{P-1}^{e(l-m)}}_{\kappa_{l,m}},$$

where $(x)^{\Theta(n)}$ denotes the element-wise n-th order of the vector x.

With (30), the equation can be rewritten as $$\hat{\zeta}_{P-l} = \underbrace{[\hat{\zeta}_{P-1}^{e(l)}, \hat{\zeta}_{P-1}^{e(l-1)}, \ldots, \hat{\zeta}_{P-1}^{e(1)}]}_{Z_l}\kappa_l, \quad (32)$$

where $\kappa_l[\kappa_{l,0}, \kappa_{l,1}, \ldots, \kappa_{l,l-1}]^T$.

When $l=P-1$, according to (27), $$\hat{\zeta}_1 = (\alpha\tau_k + \beta_1)\tau - \sum_{m=0}^{P-3}\frac{\beta_{P-m}}{(P-1-m)!}(-\tau)^{e(P-1-m)} \quad (33)$$

$$= \underbrace{\frac{(P-1)!(\alpha\tau_k + \beta_1)}{\beta_P}}_{\kappa_{P-1,P-2}}\hat{\zeta}_{P-1} +$$

$$\sum_{m=0}^{P-3}(-1)^{P-m}\underbrace{\frac{[(P-1)!]^{P-1-m}\beta_{P-m}}{\beta_P^{P-1-m}(P-1-m)!}}_{\kappa_{P-1,m}}\hat{\zeta}_{P-1}^{e(P-1-m)}$$

which is equivalent to $$\hat{\zeta}_1 = \underbrace{[\hat{\zeta}_{P-1}^{e(P-1)}, \hat{\zeta}_{P-1}^{e(P-2)}, \ldots, \hat{\zeta}_{P-1}]}_{Z_{P-1}}\kappa_{P-1}, \quad (34)$$

where $\kappa_{P-1} = [\kappa_{P-1,0}, \kappa_{P-1,1}, \ldots, \kappa_{P-1,P-2}]^T$.

With (32) and (34), $$\hat{\zeta} = \begin{bmatrix}\hat{\zeta}_1^T \\ \hat{\zeta}_2^T \\ \vdots \\ \hat{\zeta}_{P-2}^T\end{bmatrix} = \underbrace{diag\{Z_{P-1}, Z_{P-2}, \ldots, Z_2\}}_{Z}\underbrace{\begin{bmatrix}\kappa_{P-1}^T \\ \kappa_{P-2}^T \\ \vdots \\ \kappa_2^T\end{bmatrix}}_{\kappa} \quad (35)$$

and the estimation of the above parameter κ is given as $$\hat{\kappa} = (Z^TZ)^{-1}Z^T\hat{\zeta}. \quad (36)$$

Since $\kappa_{l,0}$ in κ is given as $$\kappa_{l,0} = (-1)^{l+1}\frac{[(P-1)!]^l\beta_P}{\beta_P^l l!(P-l)!} = (-1)^{l+1}\frac{[(P-1)!]^l}{l!(P-l)!}\beta_P^{1-l}, \quad (37)$$

one way to obtain the estimate of $\beta_P$ is an average of the (P−2) estimates of $\kappa_{l,0}$ in $\hat{\kappa}$ as $$\hat{\beta}_P = \frac{-\text{sign}\{\hat{\kappa}_{2,0}\}}{P-2}\sum_{l=2}^{P-1}\left(\frac{[(P-1)!]^l}{l!(P-l)!}|\hat{\kappa}_{l,0}|^{-1}\right)^{\frac{1}{l-1}} \quad (38)$$

As a result, some embodiments recover the delay parameters for the K reflectors $$\hat{\tau} = \frac{(P-1)!}{\hat{\beta}_P}\hat{\zeta}_{P-1}. \quad (39)$$

And hence the distance parameters can be recovered from the estimated delay parameters.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, and data structures that perform particular tasks or implement particular abstract data types. Typically the functionality of the program modules may be combined or distributed as desired in various embodiments. A processor for performing a function, performing a function or conFIG.d to perform a function can be implemented using circuitry in any suitable format that is programmed or otherwise conFIG.d to perform the function without additional modifications.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A frequency modulation continuous wave (FMCW)-based system, comprising:
   at least one emitter configured to transmit at least one wave of radiation to a scene, wherein the transmitted wave is linearly modulated in a frequency domain, wherein the modulation is subject to impairments causing a non-linearity of the modulation of the transmitted wave in the frequency domain;
   at least one receiver configured to receive a reflection of the transmitted wave from one or multiple objects located at different locations in the scene;
   a mixer operatively connected to the emitter and the receiver and configured to interfere a copy of the wave outputted by the emitter with the reflection of the transmitted wave received by the receiver to produce a beat signal with spectrum peaks corresponding to reflections from the different locations at the scene, wherein the beat signal is distorted due to the non-linearity of the modulation; and
   a processor configured to detect a number of spectrum peaks in the distorted beat signal and, only in response to detecting multiple spectrum peaks, jointly determine coefficients of a basis function approximating the non-linearity of the modulation and distances to the different locations at the scene having the objects causing the reflection resulting in the spectrum peaks in the distorted beat signal, such that values of the coefficients of the basis function determined jointly with values of the distances to the locations in the scene are interdependent on each other.

2. The system of claim 1, wherein the processor selects the values of the coefficients of the basis function and the values of the distances to the locations in the scene such that a beat signal reconstructed with the selected values of the coefficients of the basis function and frequency components with frequencies corresponding to the selected values of the distances to the locations in the scene approximates the distorted beat signal.

3. The system of claim 2, wherein the processor tests a set of combinations of different values of the coefficients of the basis function and different values of the distances to the locations in the scene to produce a set of recreated beat signals, and selects the coefficients and the distances resulting in the recreated beat signal closest to the distorted beat signal.

4. The system of claim 1,
   wherein the processor forms a function of unknown parameters representing a complex sinusoidal signal, wherein the unknown parameters include the coefficients of the basis function and frequencies of the spectrum peaks, wherein a number of coefficients is defined by an order of the basis function, wherein a number of the frequencies is defined by the number of the spectrum peaks in the distorted beat signal counted by the processor;
   wherein the processor determines the unknown parameters including the coefficients and the frequencies to reconstruct the distorted beat signal with the complex sinusoidal signal; and
   wherein the processor determines the distances to the different locations at the scene according to the determined frequencies.

5. The system of claim 4, wherein the processor determines the unknown parameters using a phase unwrapping.

6. The system of claim 5, wherein the processor unwraps phases of the received distorted beat signal, and fits the unwrapped phases on a model of the complex sinusoidal signal using a least squares method.

7. The system of claim 4, wherein the processor determines the unknown parameters using a time-frequency analysis.

8. The system of claim 7, wherein the processor determines frequencies of phases of the received distorted beat signal, and fits the determined frequencies phases on a model of the complex sinusoidal signal using a least squares method.

9. The system of claim 4, wherein the basis function is a polynomial phase basis function making the function of unknown parameters a polynomial function of unknown parameters with coefficients including the coefficients of the basis function and the distances.

10. The system of claim 9, wherein the processor
    determines the coefficients of the polynomial function of unknown parameters from the distorted beat signal using one or combination of variants of a high-order ambiguity function (HAF), a high-order phase function (HPF), and a time-frequency based method; and
    estimates jointly the coefficients of the basis function and the distances from the coefficients of the polynomial function of unknown parameters.

11. The system of claim 10, wherein the polynomial function of unknown parameters is $$s_b(t) = \sum_{k=1}^{K} \tilde{A}_k e^{j2\pi[(\alpha\tau_k + \gamma_{k,2})t + \gamma_{k,2}t^2 + \ldots + \gamma_{k,P-1}t^{P-1}]},$$

wherein $$\tilde{A}_k = A_k e^{j2\pi(f_c\tau_k - 0.5\alpha\tau_k^2 - \gamma_{k,0})},$$

k is the index for the k-th reflector, tau_k is the round-trip delay from the transmitter to the k-th reflector, gamma_{k, p} is a function of the nonlinearity basis coefficients and the k-th delay, alpha is the source frequency sweep rate, and A_k is proportional to the reflectivity of the k-th reflector, wherein the coefficients gamma of the polynomial function of unknown parameters include the coefficients of the basis function and the distances.

12. The system of claim 1, wherein the wave of radiation includes a widespread spatial beam, wherein the spectrum peaks correspond to reflection of the widespread beam from different objects in the same probed scene.

13. The system of claim 1, wherein the wave of radiation includes a low-spread spatial beam, wherein the emitter includes a linearly swept source of radiation and a motor or a phased array to mechanically or digitally rotate the linearly swept source in a spatial domain, wherein the spectrum peaks correspond to reflection of multiple low-spread beams from two different objects in two probed scenes.

14. The system of claim 13, wherein the processor combines the reflections of multiple low-spread beams to form the distorted beat signal with multiple spectrum peaks.

15. The system of claim 13, wherein the wave of radiation includes a low-spread spatial beam, wherein the emitter includes a linearly swept source of radiation and a motor or a phased array to mechanically or digitally rotate the linearly swept source in a spatial domain, wherein the object in the scene moves, such that at least two spectrum peaks correspond to reflections from the same object in two different locations in the scene.

16. The system of claim 15, wherein processor determines the distances to the two different positions of the object detected at two instances of time, and determines the radial velocity of the object from the two positions of the object at the two instances of time.

17. The system of claim 1, wherein the processor compares the number of spectrum peaks in the distorted beat signal with a threshold defining an accuracy of the distance estimation, and determines the distances to different locations in the scene only when the number of spectrum peaks in the distorted beat signal is greater than the threshold.

18. A method for frequency modulation continuous wave (FMCW) range estimation, wherein the method uses a processor coupled with stored instructions implementing the method, wherein the instructions, when executed by the processor carry out at least some steps of the method, comprising:

transmitting at least one wave of radiation to a scene, wherein the transmitted wave is linearly modulated in a frequency domain, wherein the modulation is subject to impairments causing a non-linearity of the modulation of the transmitted wave in the frequency domain;

receiving a reflection of the transmitted wave from one or multiple objects located at different locations in the scene;

interfering a copy of the wave outputted by the emitter with the reflection of the transmitted wave received by the receiver to produce a beat signal with spectrum peaks corresponding to reflections from the different locations at the scene, wherein the beat signal is distorted due to the non-linearity of the modulation; and detecting a number of spectrum peaks in the distorted beat signal; and jointly determining, only in response to the detecting multiple spectrum peaks, coefficients of a basis function approximating the non-linearity of the modulation and distances to the different locations at the scene having the objects causing the reflection resulting in the spectrum peaks in the distorted beat signal, such that values of the coefficients of the basis function determined jointly with values of the distances to the locations in the scene are interdependent on each other.

19. The method of claim 18, wherein the jointly determining comprises:

selecting values of the coefficients of the basis function and values of the distances to the locations in the scene such that a beat signal reconstructed with the selected values of the coefficients of the basis function and frequency components with frequencies corresponding to the selected values of the distances to the locations in the scene approximates the distorted beat signal.

* * * * *